United States Patent
Barker et al.

(10) Patent No.: US 10,450,873 B2
(45) Date of Patent: Oct. 22, 2019

(54) AIRFOIL EDGE COOLING CHANNELS

(71) Applicant: Rolls-Royce Corporation, Indianapolis, IN (US)

(72) Inventors: Brett Barker, Indianapolis, IN (US); Bruce Varney, Greenwood, IN (US); Brian Shoemaker, Indianapolis, IN (US); Charles Bulgrin, Plainfield, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 232 days.

(21) Appl. No.: 15/664,996

(22) Filed: Jul. 31, 2017

(65) Prior Publication Data
US 2019/0032493 A1 Jan. 31, 2019

(51) Int. Cl.
*F01D 5/18* (2006.01)
*F01D 9/06* (2006.01)
(Continued)

(52) U.S. Cl.
CPC ............ *F01D 5/186* (2013.01); *F01D 5/189* (2013.01); *F01D 9/042* (2013.01); *F01D 9/065* (2013.01);
(Continued)

(58) Field of Classification Search
CPC .......... F01D 5/186; F01D 5/189; F01D 9/042; F01D 9/065; F01D 5/147; F01D 5/188;
(Continued)

(56) References Cited

U.S. PATENT DOCUMENTS 2,920,866 A 1/1960 Spurrier
3,809,494 A * 5/1974 Redman ................. F01D 5/189
  415/115

(Continued)

FOREIGN PATENT DOCUMENTS

EP 0742347 A2 11/1996
EP 2472062 A1 7/2012
(Continued)

OTHER PUBLICATIONS

Ligrani et al., "Film-Cooling From Holes With Compound Angle Orientations: Part 2—Results Downstream of a Single Row of Holes With 6d Spanwise Spacing," dated May 1994, pp. 353-362, Journal of Heat Transfer, vol. 116, No. 2, Transactions of the ASME, ASME, New York, NY.

(Continued)

*Primary Examiner* — Thomas N Moulis
(74) *Attorney, Agent, or Firm* — Brinks Gilson & Lione

(57) ABSTRACT

An airfoil cooling system may be provided. An airfoil may have a pressure side and a suction side that are separated by a leading edge. The leading edge may pass through a stagnation point of the airfoil. A spar may have an outer surface comprising standoffs. The standoffs may define a cooling channel that extends across the leading edge on the outer surface of the spar, from the pressure side to the suction side. The cooling channel may have a first portion and a second portion defined by the standoffs. The first portion may be located closer to a base or a tip of the airfoil than the second portion. The spar may further comprise an inlet on the pressure side or the suction side. The inlet may be configured to convey a cooling fluid from a passageway located inside of the spar to the cooling channel.

20 Claims, 17 Drawing Sheets

(51) Int. Cl.
*F01D 9/04* (2006.01)
*F01D 5/14* (2006.01)

(52) U.S. Cl.
CPC ........ *F01D 5/147* (2013.01); *F05D 2240/121* (2013.01); *F05D 2240/303* (2013.01); *F05D 2250/183* (2013.01); *F05D 2250/184* (2013.01); *F05D 2260/201* (2013.01); *F05D 2260/202* (2013.01); *F05D 2260/204* (2013.01); *F05D 2260/2212* (2013.01); *F05D 2260/22141* (2013.01); *F05D 2300/6033* (2013.01)

(58) Field of Classification Search
CPC ......... F05D 2240/121; F05D 2240/303; F05D 2250/183; F05D 2250/184; F05D 2260/201; F05D 2250/202; F05D 2260/204; F05D 2260/2212; F05D 2260/22141; F05D 2300/6033
See application file for complete search history.

(56) References Cited

U.S. PATENT DOCUMENTS

| | | | |
|---|---|---|---|
| 4,543,781 A | 10/1985 | Rice | |
| 4,676,719 A * | 6/1987 | Auxier | F01D 5/186 415/115 |
| 4,887,663 A * | 12/1989 | Auxier | F02K 1/822 165/47 |
| 4,992,026 A * | 2/1991 | Ohtomo | F01D 5/187 415/115 |
| 5,193,975 A * | 3/1993 | Bird | F01D 5/186 415/115 |
| 5,259,730 A * | 11/1993 | Damlis | B23P 15/04 416/96 A |
| 5,383,766 A * | 1/1995 | Przirembel | F01D 5/186 416/92 |
| 5,392,515 A * | 2/1995 | Auxier | B23P 15/04 29/463 |
| 5,779,438 A * | 7/1998 | Wilfert | F01D 5/186 415/115 |
| 6,142,734 A * | 11/2000 | Lee | F01D 5/189 249/117 |
| 6,213,714 B1 * | 4/2001 | Rhodes | F01D 5/186 416/96 R |
| 6,237,344 B1 * | 5/2001 | Lee | F01D 5/186 165/908 |
| 6,427,327 B1 | 8/2002 | Bunker | |
| 6,582,186 B2 * | 6/2003 | Manzoori | F01D 5/182 415/115 |
| RE39,479 E * | 1/2007 | Tressler | F01D 5/189 415/115 |
| 7,258,528 B2 * | 8/2007 | Trindade | F01D 5/18 416/224 |
| 8,047,788 B1 | 11/2011 | Liang | |
| 8,047,789 B1 | 11/2011 | Liang | |
| 8,100,654 B1 * | 1/2012 | Liang | F01D 5/187 416/97 R |
| 8,109,724 B2 | 2/2012 | Malecki et al. | |
| 8,360,726 B1 * | 1/2013 | Liang | F01D 5/187 416/241 R |
| 8,500,405 B1 * | 8/2013 | Jones | F01D 9/065 415/115 |
| 8,608,430 B1 * | 12/2013 | Liang | F01D 5/187 415/115 |
| 8,858,176 B1 | 10/2014 | Liang | |
| 9,719,362 B2 * | 8/2017 | Rana | F01D 5/187 |
| 10,060,264 B2 * | 8/2018 | Moga | F01D 5/147 |
| 2003/0049127 A1 | 3/2003 | Tiemann | |
| 2003/0175122 A1 * | 9/2003 | Zhao | F01D 5/14 416/241 B |
| 2005/0031452 A1 * | 2/2005 | Liang | F01D 5/186 416/97 R |
| 2005/0150632 A1 * | 7/2005 | Mayer | F01D 25/08 165/47 |
| 2005/0169759 A1 * | 8/2005 | Haubert | F01D 5/147 416/193 R |
| 2005/0232769 A1 * | 10/2005 | Lee | F01D 5/187 416/97 R |
| 2008/0019840 A1 * | 1/2008 | Cunha | F01D 5/186 416/96 R |
| 2009/0010765 A1 * | 1/2009 | Propheter-Hinckley | F01D 5/147 416/97 R |
| 2010/0166565 A1 * | 7/2010 | Uskert | F01D 5/10 416/226 |
| 2010/0226788 A1 * | 9/2010 | Liang | F01D 5/187 416/97 R |
| 2010/0247327 A1 * | 9/2010 | Malecki | F01D 5/189 416/96 A |
| 2010/0247329 A1 * | 9/2010 | Morgan | F01D 5/147 416/97 R |
| 2010/0284807 A1 * | 11/2010 | Tibbott | F01D 5/187 416/95 |
| 2012/0163994 A1 * | 6/2012 | Kwon | F01D 5/186 416/97 R |
| 2012/0276308 A1 | 11/2012 | Rebak et al. | |
| 2013/0039777 A1 | 2/2013 | Piggush et al. | |
| 2013/0078428 A1 | 3/2013 | Bunker et al. | |
| 2013/0156600 A1 | 6/2013 | Bunker | |
| 2015/0016944 A1 * | 1/2015 | Vandervaart | F01D 5/186 415/1 |
| 2015/0093252 A1 * | 4/2015 | Papple | F01D 9/065 416/97 R |
| 2015/0300257 A1 | 10/2015 | Vandervaart et al. | |
| 2016/0010465 A1 * | 1/2016 | Slavens | F01D 5/186 415/115 |
| 2016/0017736 A1 * | 1/2016 | Jenkinson | F23R 3/002 415/115 |
| 2016/0024938 A1 * | 1/2016 | Slavens | F01D 5/187 416/1 |
| 2016/0146017 A1 | 5/2016 | Vogel et al. | |
| 2016/0177734 A1 * | 6/2016 | Quach | F01D 5/186 416/1 |
| 2016/0215627 A1 * | 7/2016 | Roberge | F01D 5/147 |
| 2016/0222794 A1 * | 8/2016 | Slavens | F01D 5/187 |
| 2016/0222822 A1 * | 8/2016 | Jennings | F01D 5/284 |
| 2016/0251974 A1 * | 9/2016 | Slavens | F01D 25/12 60/806 |
| 2017/0022821 A1 * | 1/2017 | Ferber | F01D 5/025 |
| 2017/0030199 A1 | 2/2017 | Barker et al. | |
| 2017/0175534 A1 * | 6/2017 | Ferber | F01D 5/147 |
| 2017/0211395 A1 * | 7/2017 | Heffernan | F01D 5/187 |
| 2018/0073390 A1 * | 3/2018 | Varney | F01D 25/12 |
| 2018/0128111 A1 * | 5/2018 | Koenig | F01D 5/147 |
| 2018/0135424 A1 | 5/2018 | Barker et al. | |
| 2018/0135426 A1 * | 5/2018 | Barker | F01D 5/187 |
| 2018/0156043 A1 * | 6/2018 | Clum | B22C 9/103 |
| 2018/0163554 A1 * | 6/2018 | O'Leary | F01D 9/065 |
| 2018/0202295 A1 * | 7/2018 | Rhodes | F01D 5/187 |
| 2018/0230833 A1 * | 8/2018 | Kush | F01D 5/34 |
| 2018/0274377 A1 * | 9/2018 | Kington | F01D 5/189 |
| 2018/0320525 A1 * | 11/2018 | Clum | F01D 5/141 |

FOREIGN PATENT DOCUMENTS

| | | | | |
|---|---|---|---|---|
| EP | 3124747 | | 2/2017 | |
| EP | 3124747 A1 * | | 2/2017 | ............ F01D 5/189 |
| EP | 3321474 A1 * | | 5/2018 | ............ F01D 5/186 |
| EP | 3335873 A1 * | | 6/2018 | ............ B32B 18/00 |
| EP | 3438411 A1 * | | 2/2019 | ............ F01D 5/186 |

OTHER PUBLICATIONS

Schmidt et al., "Film Cooling With Compound Angle Holes: Adiabatic Effectiveness," dated Oct. 1996, pp. 807-813, Journal of Turbomachinery, vol. 118, No. 4, Transactions of the ASME, ASME, New York, NY.

(56) References Cited

OTHER PUBLICATIONS

Stollery et al., "A Note on the Use of a Boundary-Layer Model for Correlating Film-Cooling Data," dated Jul. 1964, pp. 55-65, Int. J. Heat Mass Transfer, vol. B, Pergamon Press, Great Britain.
Kingery, J.E., Ames, F.E., Downs, J., Acharya, S., Barker, B.J., "An Analysis of a Deposition Tolerant Cooling Approach for Nozzle Guide Vanes," dated Jun. 15, 2015, pp. 1-11, GT2015-42419, Proceedings of ASME Turbo Expo 2015: Turbine Technical Conference and Exposition, GT2015, Montréal, Canada.
Notice of Allowance, dated May 6, 2019, pp. 1-8, issued in U.S. Appl. No. 15/352,071, U.S. Patent and Trademark Office, Alexandria, VA.
U.S. Office Action, dated Jan. 23, 2019, pp. 1-32, issued in U.S. Appl. No. 15/352,020, U.S. Patent and Trademark Office, Alexandria, VA.
U.S. Notice of Allowance, dated Mar. 5, 2019, pp. 1-14, issued in U.S. Appl. No. 15/352,071, U.S. Patent and Trademark Office, Alexandria, VA.
Extended European Search Report, issued in European Patent Application No. 17196602.1, dated Apr. 17, 2018, pp. 1-11, European Patent Office, Munich, Germany.
Extended European Search Report, issued in EP Application No. 18168123.0, dated Oct. 31, 2018, pp. 1-12, European Patent Office, Munich, Germany.
Office Action, dated Jun. 26, 2019, pp. 1-38, issued in U.S. Appl. No. 15/352,020, U.S. Patent and Trademark Office, Alexandria, VA.

\* cited by examiner

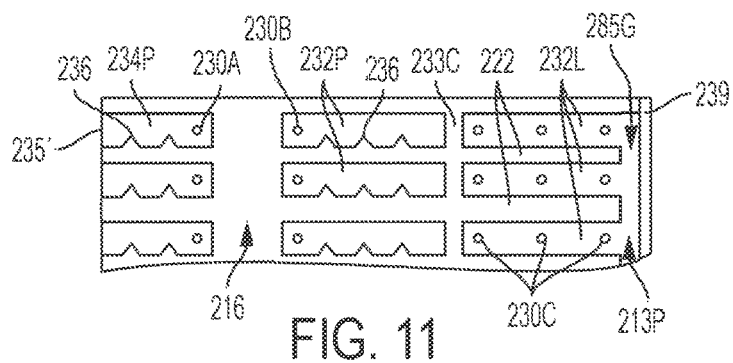
FIG. 11
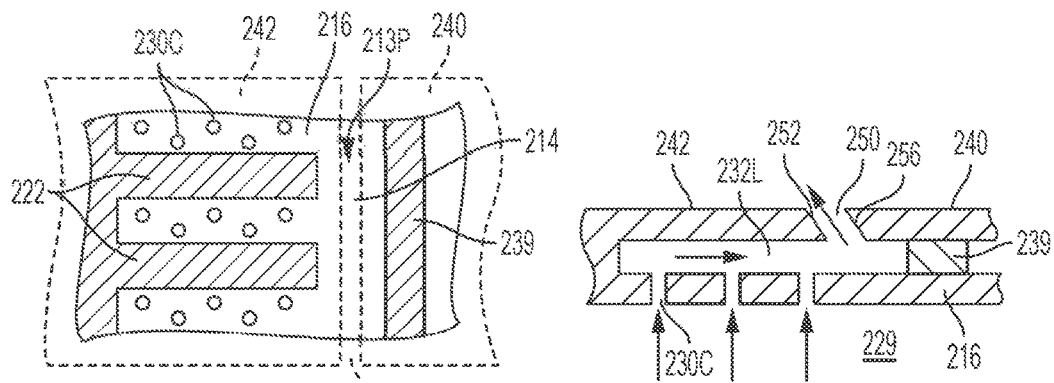
FIG. 12
FIG. 13
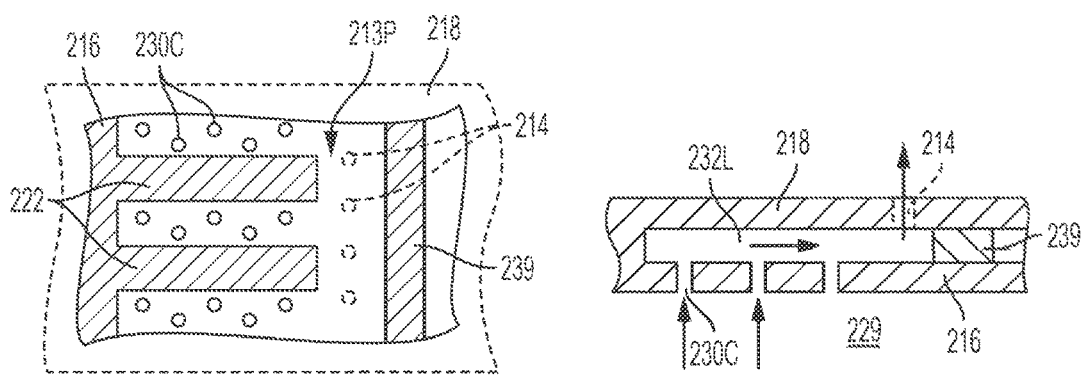
FIG. 14
FIG. 15

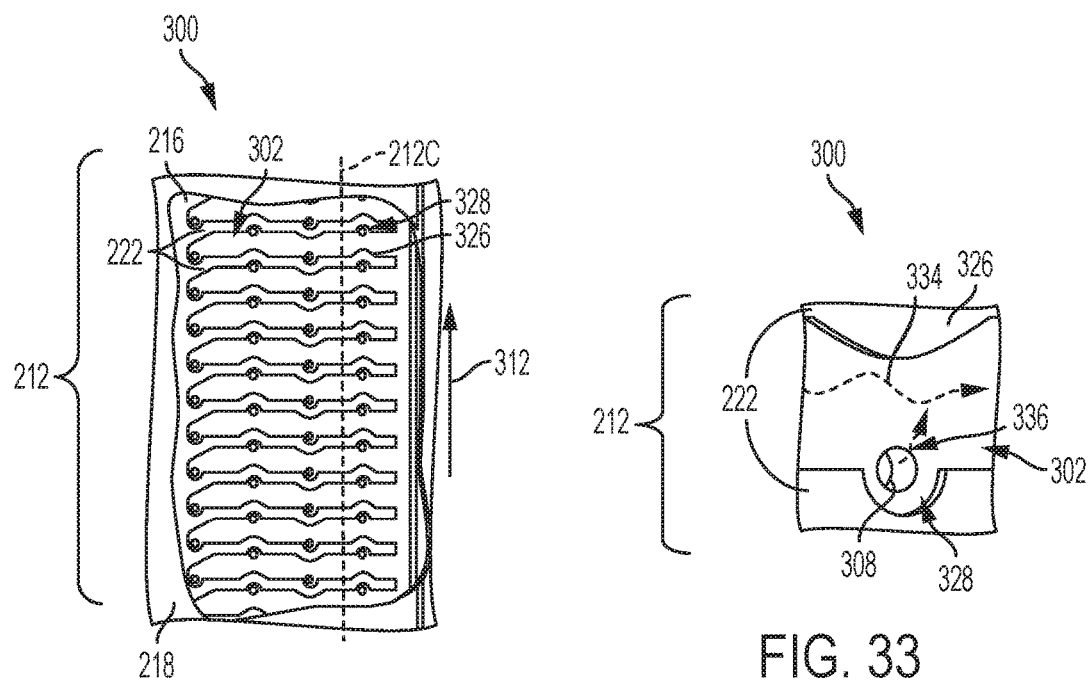
FIG. 32
FIG. 33
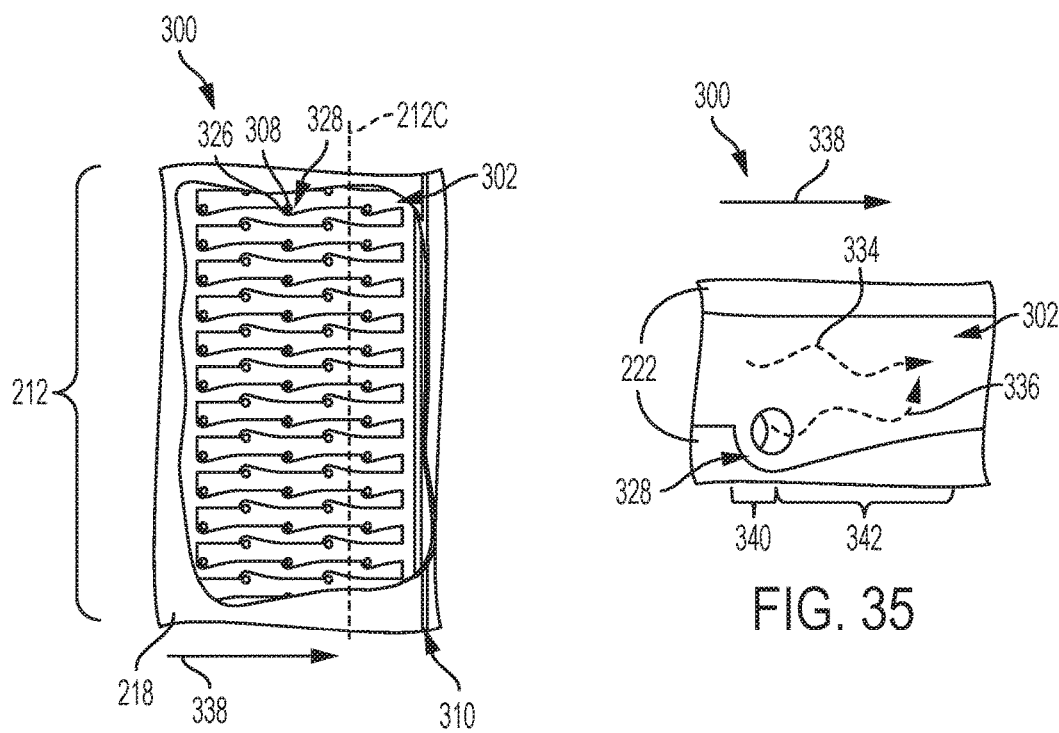
FIG. 34
FIG. 35

AIRFOIL EDGE COOLING CHANNELS

TECHNICAL FIELD

The present disclosure relates generally to gas turbine engines, and more specifically to airfoils used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Modern gas turbine engines produce high gas temperature environments that are typically above the melting temperature of the internal hardware. In order to survive in these conditions, turbine hardware typically uses a combination of cooling mechanisms to maintain an acceptable temperature. These mechanisms may include film cooling, thermal barrier coatings (TBC), and internal cooling devices. The stagnation point of the leading edge of an airfoil is an area that may experience the highest gas pressure and highest thermal loads exerted against the airfoil. The zone around the stagnation point is therefore a difficult region to cool due to reduced film effectiveness and potential blockage with debris at outlet ports because of the high gas pressure. Film cooling may be costly in terms of stage efficiency, especially in high Mach regions, and large volumes of cooling air may be required for present internal cooling devices. Thus, a need exists for improved devices and methods for airfoil cooling.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 11 depicts a partial pressure-side view of another example of a spar, provided with the airfoils of FIGS. 9-10.

FIG. 12 is a detail view of a leading edge of the airfoil of FIG. 9.

FIG. 13 is a cross-sectional view taken along line 13-13 in FIG. 12.

FIG. 14 is a detail view of a leading edge of the airfoil of FIG. 10.

FIG. 15 is a cross-sectional view taken along line 15-15 in FIG. 14.

FIG. 32 illustrates a sixteenth example of an airfoil cooling system.

FIG. 33 illustrates an example of a cooling channel 302 for an airfoil cooling system.

FIG. 34 illustrates a seventeenth example of an airfoil cooling system.

FIG. 35 illustrates an example of a cooling channel for an airfoil cooling system.

DETAILED DESCRIPTION

Disclosed herein are examples of cooling arrangements for dual-wall airfoil configurations. The airfoils may be used in gas turbine engines and combustion systems that may be used in any industry, such as, for example, to power aircraft, watercraft, power generators, and the like. One or more outlet or discharge ports or a cooling slot may be defined at or in the vicinity of the leading edge, and cooling passageways or channels are disposed along the leading edge in the direction of the pressure side. The cooling arrangements in the airfoil may overcome film lifting and improve downstream film cooling along the stagnation point region of the leading edge in the direction of the pressure side. With the hot gas pressure lower downstream, more cooling flow is allowed to be directed to the leading edge for more cooling effectiveness. Shielding of the suction side discharge from blockage may be improved when debris in the hot gas path is more likely to hit the leading edge and the pressure side. The channel arrangement and inlet impingement port configuration may allow for impingement cooling along the interior cover sheet and along the stagnation point region of the leading edge in the pressure side direction.

Figure 1:
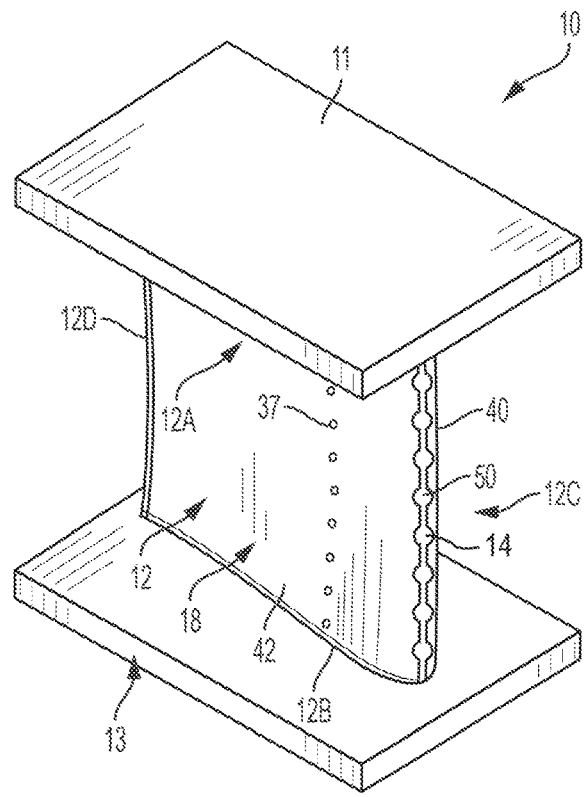
FIG. 1 is a perspective view of an example of an airfoil coupled to a pair of endwalls.
Figure 2:
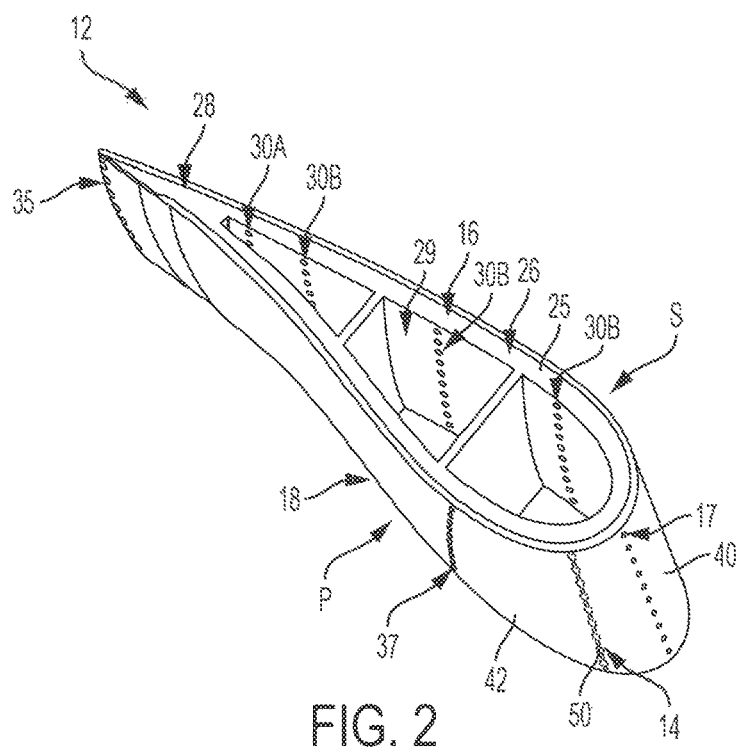
FIG. 2 is a perspective view of the airfoil of FIG. 1 without the endwalls, depicting an interior of the airfoil.

FIG. 1 shows an example of a blade 10 of a gas turbine engine. The blade 10 includes a radially outer endwall 11, a radially inner endwall 13, and an airfoil 12 coupled between the outer and inner endwalls 11, 13. The outer endwall 11 is configured to support a tip 12A of the airfoil 12 between a leading edge 12C and a trailing edge 12D of the airfoil 12, and the inner endwall 13 is configured to support a base 12B of the airfoil 12 between the leading and trailing edges 12C, 12D. Leading edge outlet ports 14 are shown disposed along the leading edge 12C. In an example, the blade 10 is a turbine blade in a turbine section of the gas turbine engine, as described below, and configured to rotate about a central axis of the engine, with the base 12B of the airfoil being in closer proximity to the central axis than the tip 12A. In another example, the blade 10 is part of a static vane assembly in a turbine section of the gas turbine engine, as described below. The blade 10 may include a dovetail-shaped root coupled to the airfoil 12 for connecting the blade 10 to a disk for rotation about a central axis of the engine. As shown in FIG. 2, the airfoil 12 is shaped to define a suction side S and a pressure side P.

With additional reference to FIG. 2, the airfoil 12 includes an internal spar 16 disposed along an airfoil axis AA (FIG. 3) and an external cover sheet 18 coupled to the spar 16, such as metallurgically bonded to the spar 16 or spar features as described below, making the airfoil 12 sometimes referred to as a dual-wall airfoil.

Figure 3:
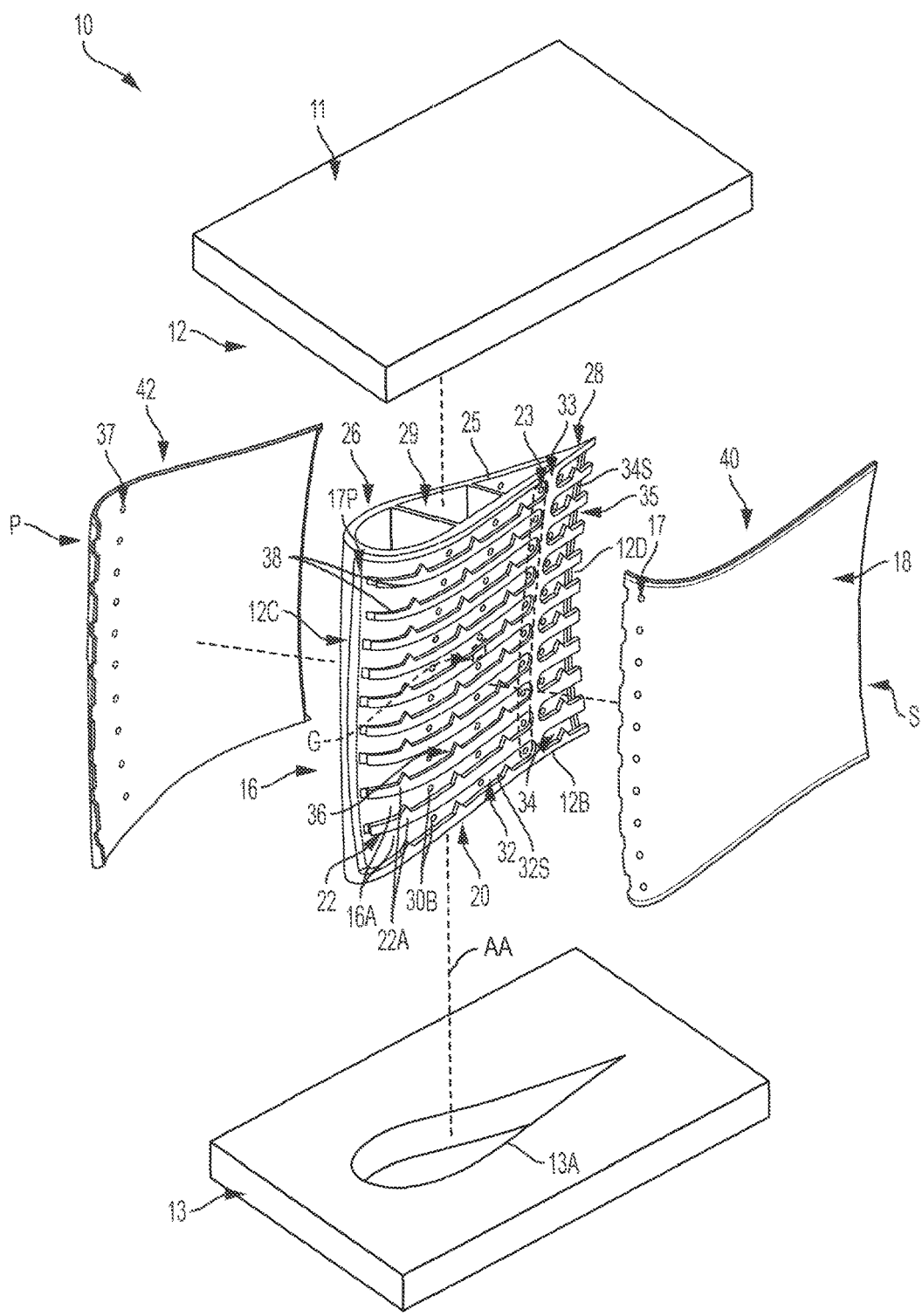
FIG. 3 is an exploded assembly view of the airfoil of FIG. 1.

In FIG. 3, the airfoil axis AA extends radially perpendicular to the central axis of the engine. As shown in FIG. 3, the spar 16 may be formed to include a plurality of grooves 20 to define a plurality of cooling passageways disposed between the spar 16 and the cover sheet 18. The grooves 20 are spaced along the spar 16 with the standoffs 22 separating the grooves 20. The standoffs 22 protrude outwardly relative to the outer surface 16A of the spar 16 that defines an aspect of the grooves 20. FIG. 3 shows a pattern of grooves 20 in an elongation row configuration extending between the leading edge 12C and the trailing edge 12D and disposed radially spaced from another relative to the central axis and along the airfoil axis AA. The grooves 20 may have other configurations such as portions running in the direction of the tip 12A and/or the base 12B. The cover sheet 18 is coupled to an outer surface 22A of the standoffs 22 with respect to the spar 16 and spaced from the outer surfaces 16A lining the grooves 20, thereby forming the cooling passageways. A flow of cooling air passing through one cooling passageway may be separated from a flow of cooling air passing through an adjacent cooling passageway by the standoffs 22.

In one example, the spar 16 is formed through a casting process to form the standoffs 22 that line the boundaries of the plurality of grooves 20 or channels. In another example, the spar 16 is machined to form the standoffs 22 and the plurality of grooves 20 or channels. In another example, the spar 22 and the cover sheet 18 are integrally formed with one another, with the standoffs 22 and the plurality of grooves 20 or channels formed between the spar 16 and the cover sheet 18. In another example, the airfoil 12, the spar 16, the standoffs, and/or the coversheet 18 are formed as a unitary component through a casting or 3-D printing process, for example.

FIGS. 2-3 depict the spar 16 including a spar wall 25 defining a body section 26 and a tail section 28 of the spar 16. The spar wall 25 is disposed to define a cooling air plenum 29 along the airfoil axis AA within the hollow spar. The cooling air plenum 29 is adapted to receive a flow of cooling air for delivery to the plurality of grooves 20 via a plurality of inlet ports (shown as inlet ports 30A, 30B, 30C, 30A', 30B') defined by the spar wall 25. The flow of cooling air may be supplied through one or more of the outer and inner endwalls 11, 13 of the blade 10. In another example, the flow of cooling air may be supplied through a dovetail-shaped root coupled to the airfoil 12. In an example, the inner endwall 13 includes a central conduit 13A defined therein which is in fluid communication with the cooling air plenum 29 within the airfoil 12. Extending below the inner endwall 13 may be a hollow shank portion (not shown) in communication with the central conduit 13A and coupled to an internal engine passageway for receiving cooling air from the compressor and distributing the cooling air within the cooling air plenum 29 of the airfoil 12.

Figure 4:
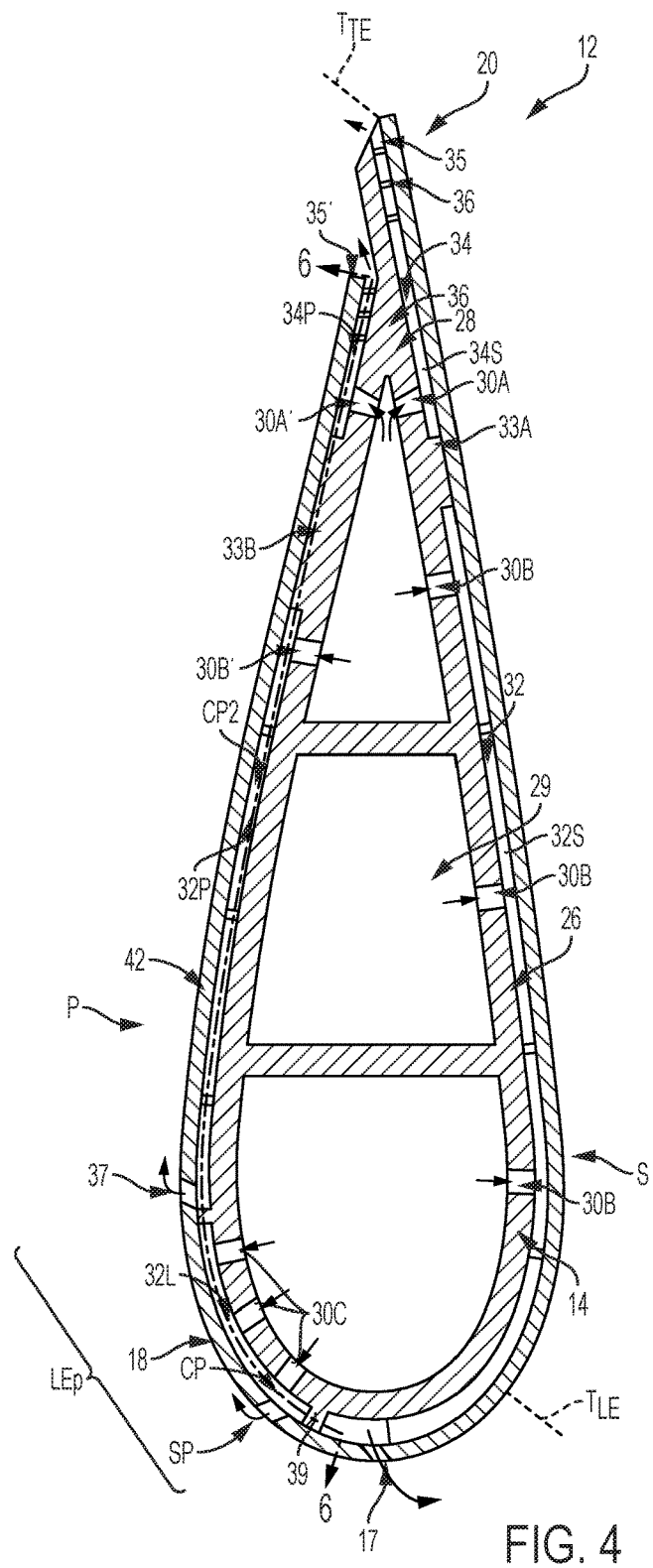
FIG. 4 is a cross-sectional view of the airfoil of FIG. 1.
Figure 6:
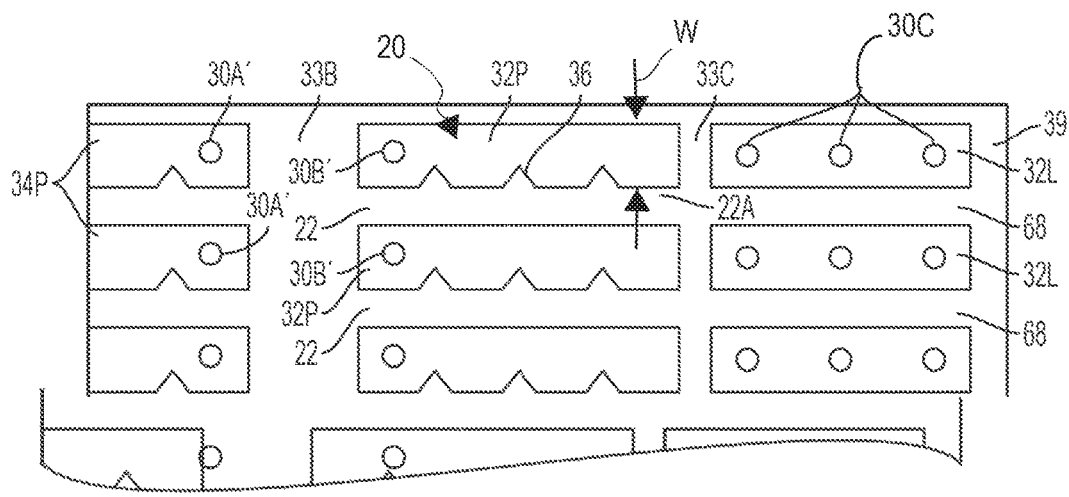
FIG. 6 is a cross-sectional view taken along line 6-6 in FIG. 4, depicting the arrangement of standoffs and leading edge wall.

With reference to FIGS. 3-4, the plurality of grooves 20 may include a plurality of body section grooves 32 and/or a plurality of tail section grooves 34. As may be appreciated by one of ordinary skill in the art, the grooves 32, 34 are shown being formed in the suction side S of the spar 16 (will now be referred with "S" following the reference numeral), may also be formed in the pressure side P of the spar 16 (will now be referred with "P" following the reference numeral), as shown in FIG. 6.

A first trailing separator wall 33A may be disposed along the suction side S between the body section grooves 32S and the tail section grooves 34S such that a flow of cooling air passing through the body section grooves 32S is separated from a flow of cooling air passing through the tail section grooves 34S. A second trailing separator wall 33B may be disposed along the pressure side P between the body section grooves 32P and the tail section grooves 34P such that a flow of cooling air passing through the body section grooves 32P is separated from a flow of cooling air passing through the tail section grooves 34P. The tail section grooves 34S extend between a first tail portion 30A of the inlet ports and an exit slot 35, downstream of the first tail portion inlet ports 30A. The tail section grooves 34P extend between a second tail portion 30A' of the inlet ports and a trailing outlet slot 35', downstream of the second tail portion inlet ports 30A'. The exit slot 35 and/or the trailing outlet slot 35' may be defined between the spar 16 and the cover sheet 18.

The standoffs 22 are shown having elongated shape to define elongate channels. The standoffs 22 defining the body section grooves 32S and/or 32P and the tail section grooves 34S and/or 34P may have other configurations than illustrated in the figures. For example, the standoffs 22 may comprise a plurality of pedestals, columns, or pins or combination of variously sized elongated members and/or pedestals, columns, or pins. The pedestals, columns or pins may have various cross-sectional shapes, including rectangular, diamond, circular or semi-circular, as well as other shapes.

The body section grooves 32S extend between a first body portion 30B of the inlet ports at the suction side S and to a plurality of first body portion outlet ports 17, which are upstream of the first body portion inlet ports 30B. The first body portion outlet ports 17 are defined by the suction-side panel 40 along the leading edge. The first body portion outlet ports 17 may be oriented toward the suction side to provide film cooling along the airfoil surface. The leading edge wall 39 is disposed between the first body portion outlet ports 17 and the leading edge outlet ports 14. An intermediate portion corresponding to cooling passageways CP2 defined by the body section grooves 32P to provide cooling along the outside boundary of the panel. The body section grooves 32P extend between a second body portion 30B' of the inlet ports at the pressure side and to a plurality of second body portion outlet ports 37, which are upstream of the second body portion inlet ports 30B'. A gap G may be formed in the standoffs 22 and/or the separator walls 33A, 33B, 33C to allow the flows of cooling air in the grooves to transfer between the adjacent respective grooves. The body section grooves 32S extend between the first body portion inlet ports 30B and an outlet-port internal plenum 17P disposed along a leading edge wall 39 where the flow of cooling air is distributed to the first body portion outlet ports 17 formed through the suction-side panel 40 as shown in FIG. 4. The leading edge wall 39 is disposed between the first body portion outlet ports 17 and the leading edge outlet ports 14.

A leading separator wall 33C may be disposed to divide the body section grooves 32P into further groove arrays, as illustrated. The leading separator wall 33C may be disposed to divide the body section grooves 32S into further groove arrays. The leading separator wall 33C may be disposed away from the leading edge wall 39 in a pressure side direction to divide the body section grooves 32P into a plurality of body section leading grooves 32L that is closer in proximity to the leading edge than a plurality of body section grooves 32P that is closer in proximity to the trailing edge. The body section leading grooves 32L extend between a third body portion 30C of the inlet ports and to the leading edge outlet ports 14, which are upstream of at least a portion of the third body portion inlet ports 30C. FIG. 4 depicts the leading edge wall 39 defined between the body section grooves 32P of the pressure side P and the body section grooves 32S of the suction side S. The separator walls 33A, 33B and/or 33C and/or the leading edge wall 39 may protrude at a similar distance as the standoffs 22 and axially extend along the airfoil axis AA at least partially, and in some examples, fully, from the base 12B and to the tip 12A.

The stagnation point SP may be located along any point of the leading edge 12C. To this end, the leading edge outlet ports 14 are shown disposed along the pressure side P, but may be disposed along the suction side S or closer to the center of the leading edge 12C. The leading edge wall 39 may be disposed at the suction side with the body section grooves 32L extending from the pressure side and across the center of the leading edge to the suction side. Alternatively, the leading separator wall 33C may be disposed to divide the body section grooves 32S into further groove arrays. The leading separator wall 33C may be disposed away from the leading edge wall 39 in a suction side direction to divide the body section grooves 32S into the plurality of body section leading grooves 32L that is closer in proximity to the leading edge than the plurality of body section grooves 32S that is closer in proximity to the trailing edge. Like the body section leading grooves 32L shown in FIG. 6, the grooves 32L formed at the suction side may extend between the third body portion 30C of the inlet ports and to the leading edge outlet ports 14.

Figure 7:
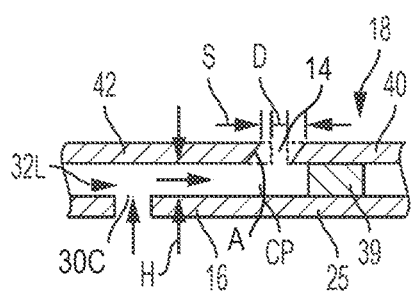
FIG. 7 is a cross-sectional view taken along line 7-7 in FIG. 5.

The cooling passageways may be sized to define microchannels. For example, a width W of the grooves 20 is defined between adjacent standoffs 22 as representatively shown by body section grooves (such as grooves 34P, 32P, 32L in FIG. 6). In an example, the width W of the grooves 20 may be 0.02 inches, 0.05 inches, or any size therebetween. Similarly, a height H of the grooves 20 or depth of the cooling passageways is defined between the spar 16 and the cover sheet 18, as shown in FIG. 7. In one example, the height H of the grooves 20 is 0.015 inches, 0.035 inches, or any size therebetween. A length L of the standoffs 22 is defined across the spanning width of the standoffs in the same direction as the width W of the grooves.

The standoffs 22 defining the grooves 20 may include at least one turbulator 36. The use of turbulators 36 enables increased cooling performance by facilitating the mixing of cooling air flow and reducing the amount of cooling air needed to cool the blade 10. The grooving facing surfaces 38 form the upright walls of the standoffs 22. The turbulators 36 are shown disposed along grooving facing surfaces 38 of the standoffs 22 and extending away from the groove facing surfaces 38 into the regions of the grooves 20. In one example, in addition to or instead of the outwardly extending turbulators, the turbulators 36 may also be formed as recesses, or inwardly facing, formed into the groove facing surfaces 38 of the spar 16. The extension or recess of the turbulators 36 may be 0.003 inches, 0.007 inches, or any size therebetween.

In FIGS. 2-3, the cover sheet 18 is shown including a suction-side panel 40 and a pressure-side panel 42. The suction-side panel 40 may be coupled to the outer surface 22A of the standoffs 22 of the suction side S of the spar 16 to at least partially cover the grooves 32, 34 for defining the cooling passageways. Similarly, the pressure-side panel 42 may be coupled to the outer surface 22A of the standoffs 22 at the pressure side P of the spar 16. The panels 40, 42 may be a thin walled member, having a wall thickness in the range, such as, for example, about 0.015 inches to 0.025 inches. The pressure-side panel 42 and the suction-side panel 40 may be arranged relative to one another to define a leading edge slot 50, as shown in FIGS. 1-2. The standoffs 22 may be extended beyond a leading end 52 of the pressure-side panel 42 toward the leading edge wall. The standoffs 22 may transverse the leading edge slot 50 and extend to the leading edge wall. This intersection of the leading edge slot 50 by the standoffs 22 define the boundary of the leading edge outlet ports 14 between the standoffs 22 and ends of the panels 40, 42.

Figure 5:
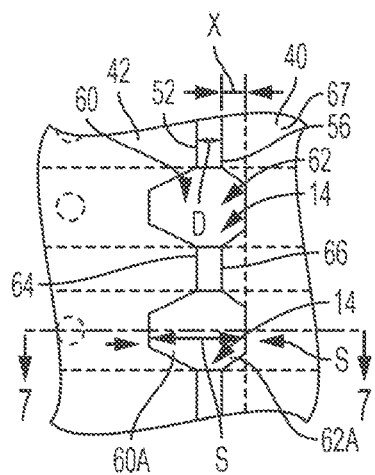
FIG. 5 is a detail view of a leading edge of the airfoil in FIG. 1.

With additional reference to FIGS. 5 and 7, the leading end 52 of the pressure-side panel 42 may be arranged adjacent to a confronting leading end 56 of the suction-side panel 40. In one example, the leading end 52 of the pressure-side panel 42 and the leading end 56 of the suction-side panel 40 are in a contacting relationship. In another example, the leading end 52 of the pressure-side panel 42 and the leading end 56 of the suction-side panel 40 may be spaced from one another by a distance D. The distance D shown between the panels in the figures is for illustrative purpose and should not be limiting. The distance D may be based on the desired mount of air flow needed. The distance D may also accommodate thermal expansion of the panels and/or manufacturing assembly tolerances. The leading end 52 and the leading end 56 may be beveled at an angle A as shown in FIG. 7. The beveling of the leading ends 52, 56 may orient the leading edge outlet ports 14 in a desired direction. For example, the direction may be toward the pressure-side to provide film cooling along the airfoil surface at a leading edge pressure side zone LEP. The LEP zone may be defined between the stagnation point SP and the second body portion outlet port 37 along the pressure-side. Of course, when cooling is desired between the stagnation point SP and the suction side, a leading edge suction zone may also be defined. For example, the desired direction from the beveled leading ends may be toward the pressure-side and/or the suction-side, and/or radially along the slot in the direction toward the airfoil tip and/or the airfoil base, or any combination thereof to provide film cooling along the airfoil surface. Body section leading grooves 32L are disposed across the LEP zone between the leading separator wall 33C and the leading edge wall 39.

The leading end 52, the leading end 56, or both, may have a notched arrangement to define aspects of the leading edge outlet ports 14 along the leading edge slot 50. In an example, the pressure-side panel 42 includes a series of first notches 60 defined in the leading end 52, and the suction-side panel 40 includes a series of second notches 62 defined in the leading end 56. Each of the first notches 60 may be radially spaced from the adjacent first notch by a series of first bridges 64. Each of the second notches 62 may be radially spaced from the adjacent second notch by a series of second bridges 66. The leading edge outlet ports 14 are defined by at least one of the first notches 60 and at least one of the second notches 62. In an example, a pair of confronting first and second notches 60, 62 defines one of the leading edge outlet ports 14. For example, the first and second notches 60A, 62A are disposed across the leading edge slot 50 from one another in a confronting and aligned relationship. To this end, the first bridges 64 and the second bridges 66 may be sized accordingly to place the first and second notches 60, 62 across from one another. The size of the first and second bridges 64, 66 is shown as being a constant size. In alternative examples, the size of the first and second bridges 64, 66 may vary in size so long as the first and second notches 60, 62 are disposed across from another. The depth of the first and second notches 60, 62 that define the leading edge outlet ports 14 have a spacing S in between the notches that is greater than the distance D. The distance D between the panels may be minimal such that the leading end 52 and the leading end 56 of the panels may be adjacent to one another. The leading ends 52, 56 may be adjacent to one another in a contacting relationship or spaced from one another by the distance D up to 0.02 inches or more. Alternatively, the leading ends 52, 56 may be coupled to one another to form an overlapping lap joint.

FIG. 6 is a side view of the spar 16 at the pressure side, with the pressure-side panel 42 and the suction-side panel 40 of the cover sheet 18 removed. The standoffs 22 are shown as discrete and extending to the leading edge wall 39 to separate the flow of cooling air in adjacent body section leading grooves 32L. In an example, the standoffs 22 are disposed radially from another relative to the central axis of the engine, extending in a direction transversing the axial direction of the leading edge wall 39 and the separator walls 33B, 33C. The transverse direction includes a direction orthogonal to the airfoil axis AA as well as up to 45 degrees relative to the airfoil axis. Third body portion 30C of the inlet ports are shown defined in the outer surface 16A disposed between the standoffs 22 where the body section leading grooves 32L are located. In an example, each of the standoffs 22 includes a leading end 68 coupled to the standoffs 22.

Turning back to FIG. 5, the leading edge outlet ports 14 are shown disposed in an overlapping relationship with the body section leading grooves 32L. In other words, the first notches 60 and the second notches 62 are shown overlapping the body section leading grooves 32L. The first and second bridges 64, 66 are shown overlapping the standoffs 22. In an example, the first and second bridges 64, 66 may have a length corresponding to the length L of the respective standoffs 22. The suction-side panel 40 may be disposed extending beyond the leading edge wall 39 in the pressure side P direction to define an overhang portion 67. In this manner, the suction-side panel 40 may be coupled to the respective outer surfaces of the leading edge wall 39 and a portion of the standoffs 22 along the suction side. The pressure-side panel 42 may be disposed spaced from the leading edge wall 39 and coupled to the outer surfaces of the standoffs 22 along the pressure side. The leading edge outlet ports 14 are shown being sized to span the width W of the grooves. Alternatively, the leading edge outlet ports 14 may be sized smaller than the width W or larger than the width W. Alternatively, more than one leading edge outlet ports 14 may occupy the width of a single groove.

FIG. 7 illustrates a cross-sectional view of FIG. 5 taken along lines 7-7, depicting the relative distance between the spar 16 and the pressure-side panel 42 and the suction-side panel 40 of the cover sheet 18. The panels 40, 42 of the cover 18 are shown disposed over the body section leading grooves 32L for defining the cooling passageways CP in fluid communication with the leading edge outlet ports 14 and the third body portion 30C of the inlet ports. The flow of cooling air is delivered from the cooling air plenum 29 to the body section leading grooves 32L via the third body portion 30C of the inlet ports for cooling impingement against the pressure-side panel 42 of the cover sheet 18. The flow of cooling air then travels down the body section leading grooves 32L and exits the body section leading grooves 32L via the leading edge outlet ports 14 at the leading edge slot 50.

The number of third body portion 30C of the inlet ports along each of the body section leading grooves 32L may be one, two, three (shown) or more. Additional inlet ports may provide better distribution of impingement cooling of the cover sheet. FIG. 4 illustrates all of the third body portion 30C of the inlet ports located upstream of the location of the leading edge outlet ports 14 such that the cooling air flow runs upstream to exit the leading edge outlet ports 14. Alternatively, the location of the leading edge outlet ports 14 may be disposed between adjacent third body portion 30C of the inlet ports such that the cooling air flow runs upstream and downstream to exit the leading edge outlet ports 14. The body section leading grooves 32L may also be referred to as microchannels, which may not include any turbulators. The body section leading grooves 32L may be configured as a linear path to minimize the pressure losses of the flow of cooling air within the grooves. To this end, there is minimal pressure drop from the flow of cooling air within the plenum to the leading outlet ports. A higher pressure cooling air at the leading outlet ports may reduce the potential for high gas ingestion into the airfoil and the potential for debris into the airfoil through the leading outlet ports, thereby improving the cooling efficiency along the leading edge at the leading edge pressure side zone LEP. A higher pressure cooling air at the leading outlet ports may increase the film cooling downstream of the leading outlet ports along the leading edge at the leading edge pressure side zone LEP.

Figure 8:
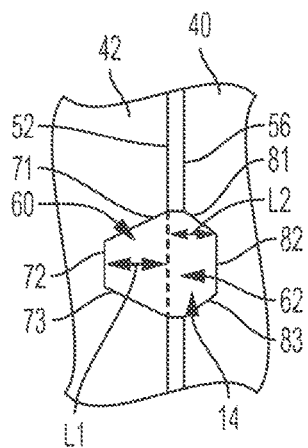
FIG. 8 is a detail view of an example of a notch arrangement of the airfoil in FIG. 1.

FIG. 8 depicts an example shape of the first notch 60 and an example shape of the second notch 62. The first notch 60 may be defined by three walls: a first wall 71, a second wall 72, and a third 73. The first and third walls 71, 73 may be inclined toward the second wall 72 that is disposed at a first depth L1 from the leading end 52 to define a tapered notch. The second wall 72 may be in parallel with the leading end 52. The second notch 62 may be defined by three walls: a first wall 81, a second wall 82, and a third 83. The first and third walls 81, 83 may be inclined toward the second wall 82 that is disposed at a second depth L2 from the leading end 56 to define a tapered notch. The second wall 82 may be in parallel with the leading end 56.

Figure 9:
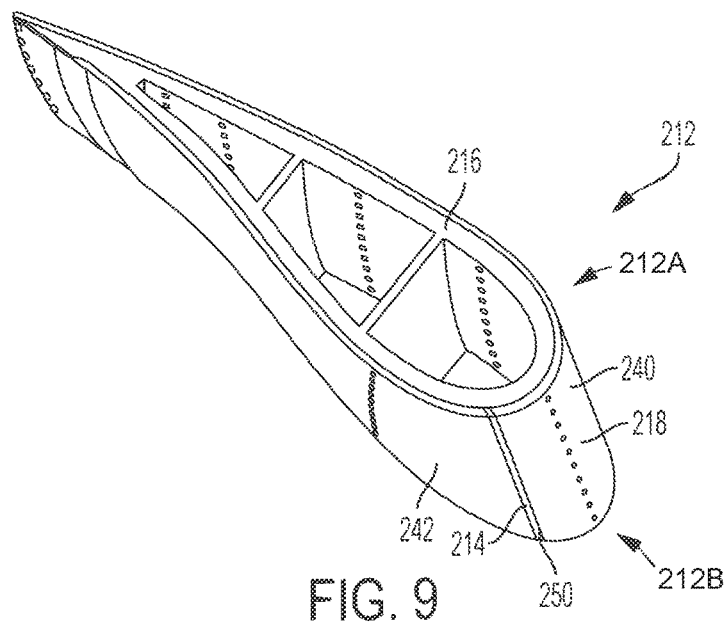
FIGS. 9-10 depict other examples of airfoils.
Figure 10:
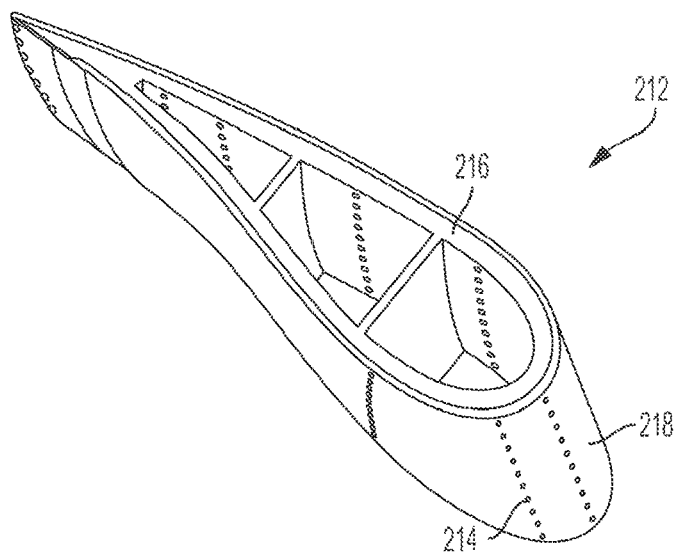

FIGS. 9-10 depict other examples of the dual wall airfoil 212, having features described with respect to the airfoil 12, with the spar 216 shown in FIG. 11. The spar may include the tip 212A and the base 212B. The airfoil 212 may benefit from the higher pressure cooling air at the leading outlet ports for improving the cooling efficiency along the leading edge at the leading edge pressure side zone LEP. As shown in FIG. 9, the airfoil 212 may the cover sheet 218 in the form of the pressure-side panel 242 and the suction-side panel 240 arranged to define the leading edge continuous slot 250. As shown in FIG. 10, the airfoil 212 includes the cover sheet 218 shaped and sized to fit around the leading edge of the spar 216, with the series of leading outlet ports 214 defined by the cover sheet 218.

FIG. 11 is a side view of the spar 216 at the pressure side, with the cover sheet 218 removed. The standoffs 222 are shown extending in a transverse direction toward the leading edge wall 239, with the end 269 of the standoffs 222 being spaced from the leading edge wall 239 to define a plenum gap 285G therebetween. The body section grooves 232L extend between the third portion 230C of the inlet ports and the outlet-port internal plenum 213P' where the flow of cooling air is distributed to the leading outlet ports formed through the cover sheet 218 as will be described. The body section grooves 232P are separated from the body section grooves 232L by the leading separator wall 233C. The body section grooves 232P are separated from the tail section grooves 234P by the separator wall 233B such that a flow of cooling air passing through the body section grooves 232P from the cooling air plenum via the second body portion inlet ports 230B' is separated from a flow of cooling air passing through the tail section grooves 234P from cooling air plenum via the second tail portion inlet ports 230A'. The tail section grooves 234P extend between the second tail portion 230A' of the inlet ports and the trailing outlet slot 235', downstream of the second tail portion inlet ports 230A'. The trailing outlet slot 235' may be defined between the spar 216 and the cover sheet 218. Turbulators 236 may be disposed, as shown, along the groove facing surfaces.

FIG. 12 depicts the airfoil 212 including the spar 216 with the cover sheet the pressure-side panel 242 and the suction-side panel 240 (shown in dashed lines) in place. The suction-side panel 240 may be coupled to the respective outer surfaces of the leading edge wall 239 and a portion of the standoffs 222 along the suction side. The pressure-side panel 242 may be disposed spaced from the leading edge wall 239 and coupled to the outer surfaces of the standoffs 222 along the pressure side. The outlet port 214 in the form of the leading edge slot 250 may be disposed over the outlet-port internal plenum 213P'.

FIG. 13 depicts the flow of cooling air delivered from the cooling air internal plenum 229 to the body section grooves 232L via the third body portion 230C of the inlet ports (with five ports/groove shown in a staggered pattern) for impingement cooling of the pressure-side panel 242 of the cover sheet 218. The flow of cooling air then travels down the grooves 232L and exits the grooves 232L via the leading edge slot 250. The leading ends 252, 256 of the panels 240, 242 may be beveled to direct the cool air flow toward the pressure side.

FIG. 14 depicts the airfoil 212 including the spar 216 with the cover sheet 218 in a single sheet configuration (shown in dashed lines) in place. The cover sheet 218 may be coupled to the respective outer surfaces of the leading edge wall 239 and a portion of the standoffs 222 along the suction side and the pressure side. The leading outlet ports 214 may be disposed over the outlet-port internal plenum 213P'.

FIG. 15 depicts the flow of cooling air delivered from the cooling air internal plenum 229 to the body section grooves 232L via the third body portion 230C of the inlet ports (with three ports/groove shown) for cooling impingement against the cover sheet 218. The flow of cooling air then travels down the grooves 232L and exits the grooves 232L via the leading outlet ports 214. The leading outlet ports 214 may be inclined with respect to the outer surface to direct the cool air flow toward the pressure side.

Figure 16:
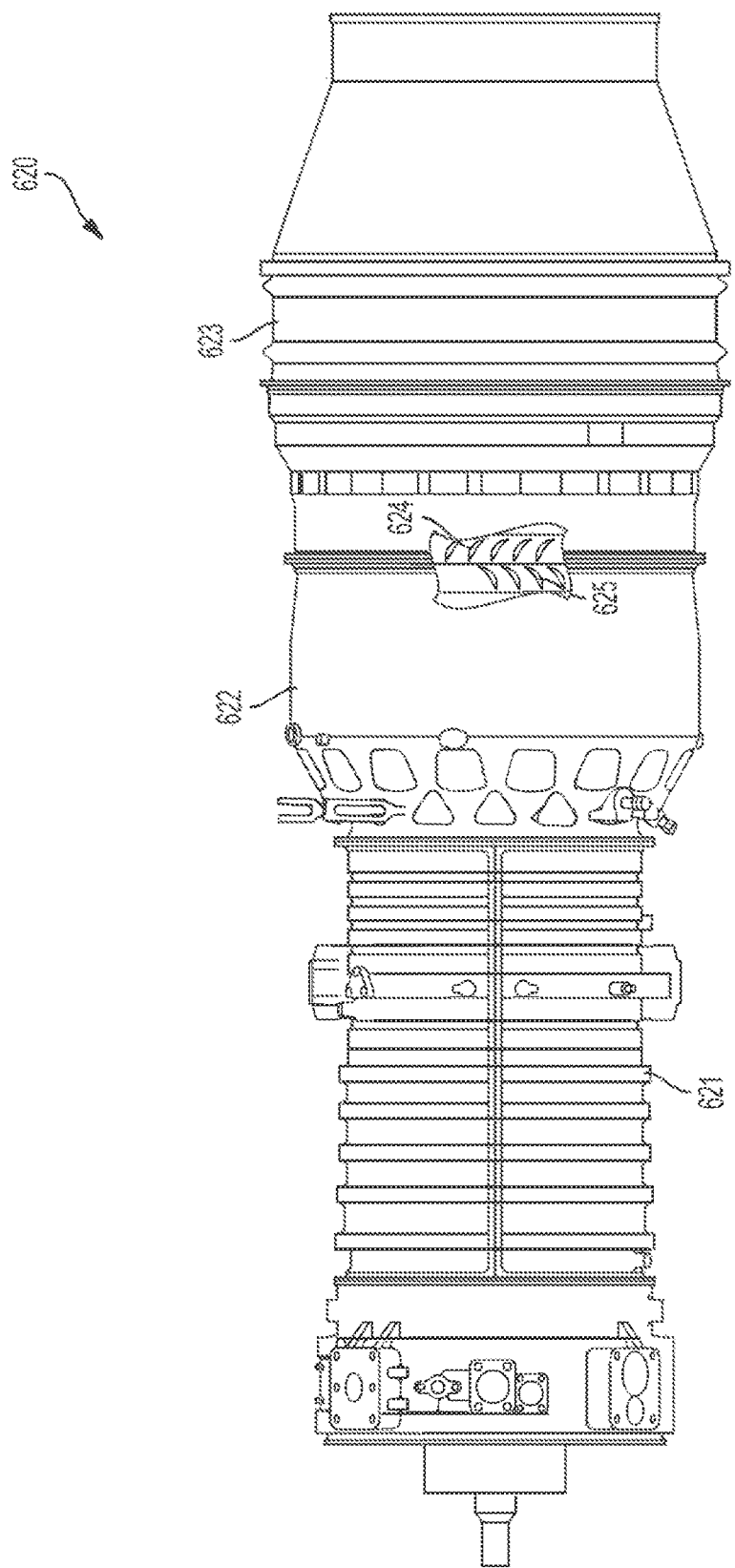
FIG. 16 depicts a gas turbine engine including an example of an airfoil.

Referring to FIG. 16, there is illustrated a gas turbine engine 620 which includes a compressor 621, a combustor 622 and a power turbine 623. The three components have been integrated together to produce an aircraft flight propulsion engine. The term aircraft is generic and includes helicopters, airplanes, missiles, unmanned space devices and any other substantially similar devices. There are a multitude of ways in which the gas turbine engine components may be linked together. Additional compressors and turbines could be added with intercoolers connecting between the compressors and reheat combustion chambers could be added between the turbines. Further, the gas turbine engine is equally suited to be used for an industrial application. Historically, there has been widespread application of industrial gas turbine engines, such as pumping sets for gas and oil transmission lines, electricity generation and naval propulsion.

Turbine blades 624 are coupled to a rotor disk that is affixed to a shaft rotatable within the gas turbine engine 620. A plurality of vanes 625 are conventionally joined together to collectively form a complete 360-degree nozzle. It is understood herein that gas turbine engine blades and vanes are often referred to as airfoils, such as the airfoils 12, 212. Other products utilizing the airfoils 12, 212 are contemplated herein including but not limited to combustor liners, exhaust nozzles, exhaust liners, airframe wing leading edges, and/or other actively cooled components. The compressor 621 provides cooling air to the cooling air plenum 29 of the airfoils 12, 212 through the internal engine passageway leading from the compressor to the power turbine 623, and traversing the hollow shank portion, the central conduit 13A of the inner endwall 13 and into the airfoil. The cooling air may be a compressible fluid such as air.

In one example, the airfoils 12, 212 of the gas turbine engine and its components are formed of a heat resistant superalloy composition, a ceramic material, such as a ceramic-matrix composite (CMC) material, or other materials used for components. There are various types of superalloy compositions, such as but not limited to nickel based or cobalt based compositions, and the manufacturers of such compositions are generally known to those skilled in the art. Most superalloy compositions of interest are complicated mixtures of nickel, chromium, aluminum and other select elements. The airfoils 12, 212 may be of a unitary cast configuration, and/or an assembly of cast components, and/or an assembly of cast and wrought components. The airfoils may have an equiax, directionally solidified or a single crystal alloy structure. In one example, the airfoil is of a cast single crystal single structure. Further, in alternate examples, the products are formed of a metallic material, or an intermetallic material or a ceramic material. In one example, the spar is formed through a casting process to form the standoffs that line the boundaries of the plurality of grooves or channels. In another example, the spar is machined to form the standoffs and the plurality of grooves or channels. In another example, the spar and the cover sheet are integrally formed with one another, with the standoffs walls and the plurality of grooves or channels formed between the spar and the cover sheet. In another example, the airfoil is formed as a unitary component through a casting or 3-D printing process, for example.

The cooling passageways or cooling microchannels run below the airfoil surface to transport cooling air to one or more film outlet ports or slot at the leading edge. Impingement inlet ports may be positioned along the length of the channel. The channels shape, impingement hole location/quantity, and turbulator location/quantity may be configured to maintain the desired cooling flow rate and heat transfer over the entire length of the channel. The film outlet ports or slot may be configured to reduce the aerodynamic penalty and further reduce surface temperatures. Embedding the channels below the airfoil surface allows for higher cooling effectiveness. Coolant air enters the cooling channel and flows along the smooth surface.

In general, an airfoil in a gas turbine engine may be exposed to thermal stresses as it operates in a gas turbine engine. The leading edge of the airfoil may pass through a stagnation point where fluid flows at a low velocity relative to elsewhere on the airfoil. The resulting high pressure at the stagnation point causes filming cooling along the leading edge to be less efficient. Accordingly, additional cooling at the leading edge may be desirable under some conditions. As described below, the airfoil may utilize cooling channels to improve heat transfer at the leading edge of the airfoil before cooling fluid is discharged to the outer surface of the airfoil.

One interesting feature of the system and method described below may be that a cooling channel may change shape and orientation over the length of the cooling channel, which may aid in extracting heat from the leading edge before being discharged for film cooling. For example, the flow of cooling fluid in a cooling channel may oscillate to increase surface area and promote higher heat transfer. Alternatively or in addition, the cooling fluid may traverse protrusions and pockets along the cooling channel before being discharged to the leading edge surface.

Another interesting feature of the systems and methods described below may be that the cooling channel may be curved. A curved cooling channel may cause the flow of the cooling fluid to be angled toward an outlet for film cooling. For rotating airfoils, the change in radial position may be accompanied by a centrifugal pumping effect, which may be used to further tailor and/or promote the flow of the cooling fluid. In other examples, the walls of the cooling channel may be discontinuous to allow for cross flow communication and enhanced mixing. The examples of the system and methods described below provide additional and/or different features which may improve cooling for an airfoil in a gas turbine engine.

Figure 17:
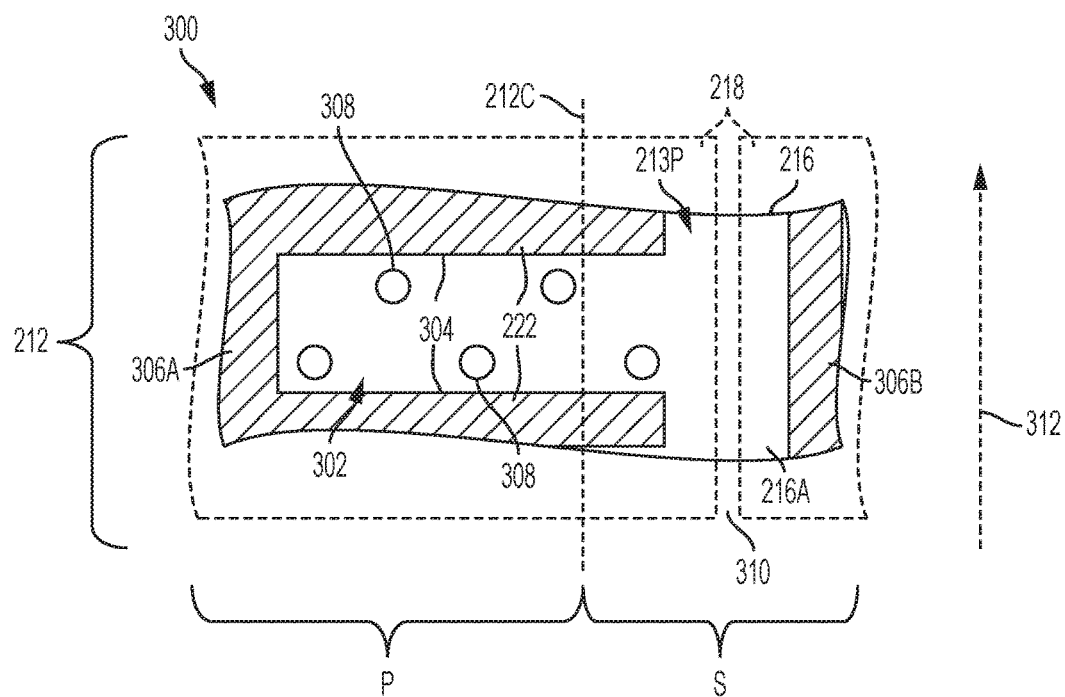
FIG. 17 illustrates a first example of an airfoil cooling system.

FIG. 17 illustrates a first example of an airfoil cooling system 300. The system 300 may include the airfoil 212 (only a portion shown in FIG. 17.) The airfoil 212 may include the spar 216 and/or the cover sheet 218. The standoffs 222 on the outer surface of the spar 216 may extend across the leading edge 212C of the airfoil 212. For example, the standoffs 222 may extend along the surface of the spar 216 from a first side of the airfoil 212, across the leading edge 212C, and to a second side of the airfoil 212. The first side of the airfoil 212 may include the pressure side P and the second side of the airfoil 212 may include the suction side S. Alternatively, the first side of the airfoil 212 may include the suction side S and the second side of the airfoil 212 may include the pressure side P.

The standoffs 222 (only two of the standoffs 22s are shown in FIG. 17) may direct cooling fluid between the standoffs 222 and along the outer surface 216A of the spar 216. Pairs of adjacent standoffs may define respective cooling channels on the outer surface 216A of the spar 216 to direct the cooling fluid. For example, two of the standoffs 222 may define a cooling channel 302. Alternatively or in addition, opposing sides 304 of the standoffs 222 may define the cooling channel 302. For example, the opposing sides 304 of the standoffs 222 may extend from the suction side S to the pressure side P. The cooling channel 302 may be defined between the opposing sides 304 of the standoffs 222 and extend across the leading edge 212C of the airfoil 212.

The cooling channel 302 may include any passageway that is at least partially defined by one or more of the standoffs 222 to guide the cooling fluid. In addition, the cooling channel 302 may be defined by any combination of the cover sheet 218, the outer surface 217A of the spar 216, one or more of the dams 306, and/or any other portion of the airfoil 212. The cooling channel 302 may include a passageway, a channel, an elongated channel, grooves 20, and/or a microchannel. An example of the microchannel may include a passage with a hydraulic diameter less than 1 mm and/or with a cross sectional area less than 1 square mm. The cooling channel 302 may convey the cooling fluid across the leading edge 212C of the airfoil 212, from the pressure side P to the suction side S as shown in FIG. 17. Alternatively or in addition, the cooling channel 302 may convey the cooling fluid from the suction side S to the pressure side P. In some examples, the cooling channel 302 may convey the cooling fluid from one or more inlet 308, across the leading edge 212C, and to the outlet 310. The cooling channel 302 may cross the leading edge 212C and extend any chordwise length on the pressure side P and/or the suction side S of the airfoil 212.

In some examples, one or more of the dams 306 may define the cooling channel 302. A dam may include a raised portion of the outer surface 216A of the spar 216 that extends along the spanwise direction 312 or otherwise intersects the standoffs 222. One or more of the dams 306 may separate the cooling channel 302 from an adjacent channel (not shown in FIG. 17) and/or any other region on the outer surface 216A of the spar 216. Examples of the dams 306 may include any leading walls 39, 239 and/or separator walls 33A, 33B, 33C, 233A, 233C, 233D. In some examples, the spar 216 may include a first dam 306A on the pressure side P. The first dam 306A may define a first end of the cooling channel. The cooling channel 302 may extend, from the first dam 306A, across the leading edge 212C, and toward a second dam 306B. The second dam 306B may be positioned on the suction side S, or in other examples, on the pressure side P. In some examples, the standoffs 222 may join the second dam 306B such that the second dam 306B forms a second end of the cooling channel 302. Alternatively, as illustrated in FIG. 17, the standoffs 222 may be separated from the second dam 306B by a plenum, such as the outlet port internal plenum 213P'.

The spar 216 may include one or more inlet 308. The inlet 308 may release the cooling fluid to the outer surface 216A of the spar 216. For example, the inlet 308 may include an opening positioned on the outer surface 216A of the spar 216 that releases the cooling fluid from an interior of the spar 216. The inlet 308 may extend from the outer surface 216A of the spar 216 to an internal passageway of the spar 216. For example, the inlet 308 may extend into the cooling air internal plenum 229 of the spar 216. Alternatively or in addition, the inlet 308 may form a portion of the cooling air internal plenum 229. The inlet 308 may receive the cooling fluid from the cooling air internal plenum 229 of the spar 216 and direct the cooling fluid to a portion of the outer surface 216A of the spar 216 that defines the cooling channel 302. Alternatively or in addition, the inlet 308 may include any example of an inlet port described herein.

In some examples, multiple inlets may be arranged on the outer surface 216A of the spar 216 to release cooling fluid into the cooling channel 302. For example, the inlets may be staggered within the cooling channel 302. For example, a first row of the inlets may be offset from a second row of the inlets along a spanwise direction 312. Alternatively or in addition, the inlets may be arranged in any uniform or non-uniform pattern within the cooling channel 302. Staggering the inlets may provide for more impingement coverage. In addition, by spreading out the inlets, there is less aggressive mixing between the holes and the cross flow.

The outlet 310 may include any opening at least partially defined by the cover sheet 218. The outlet 310 may convey the cooling fluid to the outer surface of the cover sheet 218. For example, the outlet 310 may extend through the cover sheet 218. The outlet 310 may receive the cooling fluid from the cooling channel 302 and/or a space between the outer surface 216A of the spar 216 and the inner surface of the cover sheet 218. For example, the outlet 310 may receive cooling fluid from the outlet port internal plenum 213P'. The outlet 310 may include a slot defined between two separate cover sheets. Alternatively or in addition, the outlet 310 may include a slot defined between two portions of the cover sheet 218. In other examples, the outlet 310 may include any example of outlet described herein, including the leading edge outlet ports 214 or the leading edge slot 250. For example, the outlet 310 may be defined between the pressure-side panel 242 and the suction-side panel 240 as illustrated in FIG. 9. Alternatively or in addition, the outlet 310 may be included on the pressure side P and/or the suction side S of the airfoil 212.

In general, the system 300 may include any example of airfoils 12, 212 described herein. In addition, the airfoil 212 may include any example of the spars 16, 216, and/or cover sheets 18, 218 described herein. In some examples the airfoil cooling system 300 may combine features from one embodiment with features from another embodiment.

Figure 18:
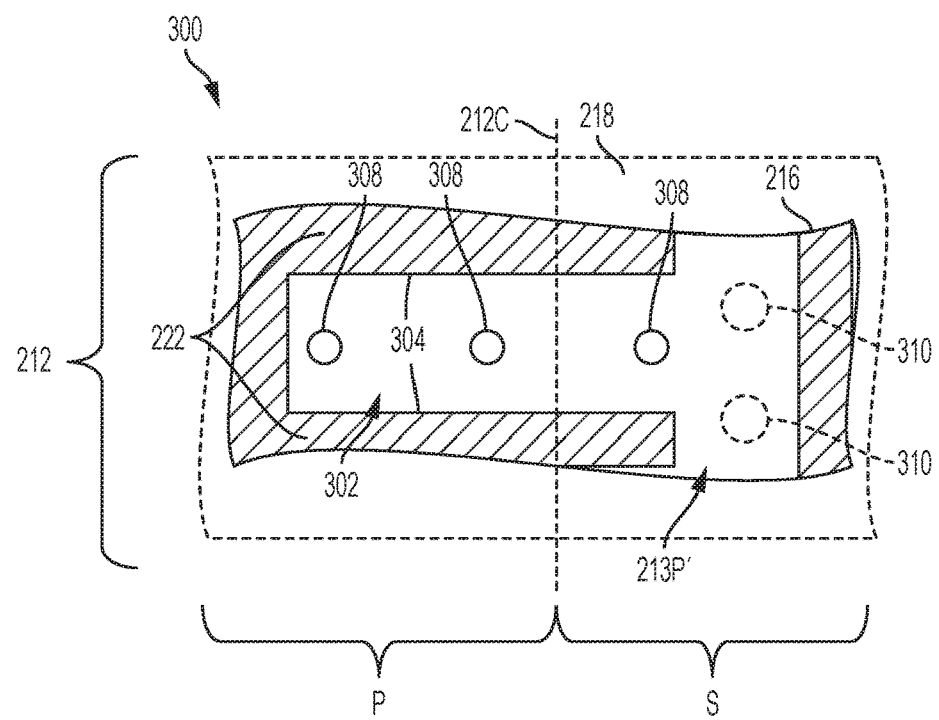
FIG. 18 illustrates a second example of an airfoil cooling system.

FIG. 18 illustrates a second example of the airfoil cooling system 300. The system 300 may include the airfoil 212. The spar 216 of the airfoil 212 may include standoffs 222 that define the cooling channel 302. The cooling channel 302 may guide the cooling fluid from one or more inlet 308 to one our more outlets 310. The one or more inlet 308 may be arranged within the cooling channel 302 in any uniform or non-uniform arrangement. For example, the inlets may be aligned within the cooling channel 302 in a single row. The cooling fluid flowing from a first inlet may be diverted by cooling fluid flowing out of one or more successive inlets downstream of the first inlet. Accordingly, cooling fluid from the first inlet may flow around the successive inlets downstream of the first inlet.

In some examples, the outlet 310 may include a passage that may extends through the cover sheet 218. The cooling channel 302 may direct cooling fluid toward one or more outlet 310. The outlet 310 may be positioned over the outlet port internal plenum 213P'. In other examples, the outlet 310 may be positioned over the cooling channel 302 and between the standoffs 222. Alternatively or in addition, the outlet 310 may be positioned on the press side P, the suction side S, and/or along the leading edge 212C.

In some examples, conveying the cooling fluid across the leading edge 212C of the airfoil 212 may provide for increase manufacturing efficiencies or improve cooling tradeoffs resulting from a chosen manufacturing technique. For example, a first portion of the spar 216 may be covered by the coversheet 218 while a second portion of the spar 216 may be exposed. Moreover, various portions of the spar 218 may be exposed and subsequently covered throughout the manufacturing process. In some examples, the inlet 308 may be formed, by a drilling process for example, prior to joining the coversheet 218. Alternatively the cooling channel 302 may convey the cooling fluid to portions of the airfoil 212 where impingement cooling, for example cooling from the inlet 308, is less feasible due to the manufacturing process used to form the airfoil 212. Conveying the cooling fluid from in, or opposite to, the spanwise direction 312 from a first side of the airfoil 212 to a second side of the airfoil 212 may improve cooling of the airfoil 212. In other examples, the cooling channel 302 may be configured to account for centrifugal forces applied to the airfoil 212. Alternative or in addition, the cooling channel 302 may be configured to increase or decrease the amount of surface area that the cooling fluid within the cooling channel is exposed to before the cooling fluid provides film cooling to the airfoil 212. Alternatively or in addition, the cooling channel 302 and/or one or more of the inlet 308 may be configured to achieve various cooling objectives on the suction side S, pressure side S and/or both sides of the airfoil 212.

Figure 19:
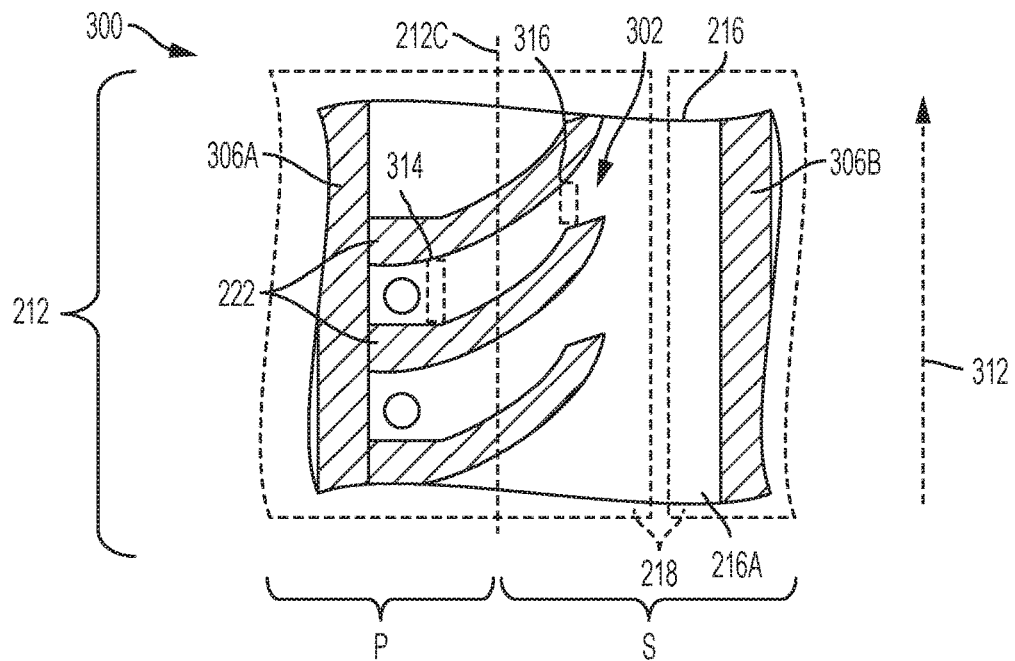
FIG. 19 illustrates a third example of an airfoil cooling system.

FIG. 19 illustrates a third example of the airfoil cooling system 300. The cooling channel 302 may include a first section 314 defined between the standoffs 222 and a second section 316 defined between the standoffs 222. The first section 314 of the cooling channel 302 may be separate and distinct from the second section 316 of the cooling channel 302. The outer surface 216A of the spar 216, the inner surface of the cover sheet 218, one or more of the dams 306, and/or any other structure of the spar 216 may further define the first section 314 and/or the second section 316 of the cooling channel 302.

The second section 316 of the cooling channel 302 may be offset from the first section 314 of the cooling channel 302 in the spanwise direction 312. As show in FIG. 19, the first section 314 of the cooling channel 302 may be on the pressure side P of the airfoil 212. The second section 316 of the cooling channel 302 may be on the suction side S of the airfoil 212. In other examples, the first second and the second section may be on the same side of the airfoil. Alternatively or in addition, the first section 314 or the second section 316 may be positioned along the leading edge 212C. In some examples, the spanwise direction 312 may be oriented toward the tip 212A of the airfoil 212. The second section 316 of the cooling channel 302 may be closer to the tip 212A of the airfoil 212 than the first section 314 of the cooling channel 302. In other examples, the second section 316 may be further from the tip than the first section 314.

Offsetting the first section 314 and the second section 316 of the cooling channel 302 provides numerous configurations for the cooling channel 302. For example, the cooling channel 302 may curve along the spanwise direction 312 toward the tip 212A of the airfoil 212. Alternatively or in addition, the cooling channel 302 may curve toward the base 212B of the airfoil 212. In some examples, the cooling channel 302 may continuously curve in the spanwise direction 312 from the pressure side P of the airfoil 212 to the suction side S of the airfoil 212. Alternatively or in addition, the cooling channel 302 may curve between the first section 314 of the cooling channel 302 and the second section of the cooling channel 302. The cooling channel 302 may convey cooling fluid received from the inlet 308 across the leading edge 212C of the airfoil 212 and toward the tip 212A of the airfoil 212

In some examples, the cooling channel 302 may curve away from an axis of rotation and/or the base 212B of the airfoil. For example, the airfoil 212 may form part of a turbine that rotates with a turbine disk, as illustrated in FIG. 16. The cooling channel 302 may curve along the spanwise direction 312, away from the turbine disk. As the airfoil rotates with the turbine disk, the cooling fluid may be centrifugally directed along the spanwise direction 312 and/or toward the tip 212A of the airfoil 212.

Alternatively or in addition, the standoffs 222 may curve to define one or more curves in the cooling channel 302. For example, the cooling channel 302 may be defined between two of the standoffs 222. The standoffs 222 may curve the cooling channel 302 as the standoffs 222 may extend chordwise along the airfoil 212 and in the spanwise direction 312.

Figure 20:
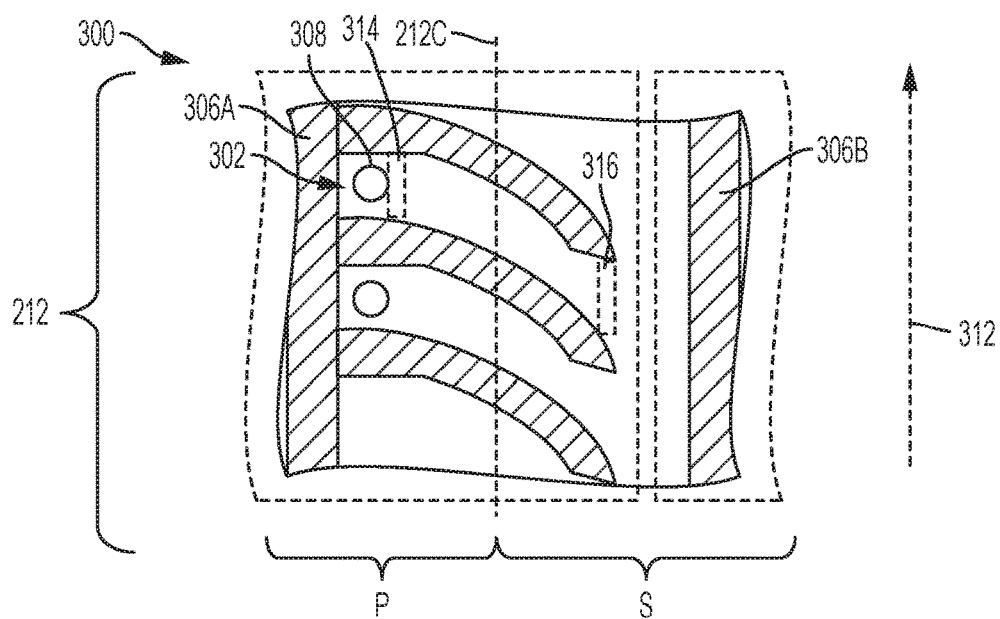
FIG. 20 illustrates a fourth example of an airfoil cooling system.

FIG. 20 illustrates a fourth example of the airfoil cooling system 300. As illustrated in the example in FIG. 20, the first section 314 of the cooling channel 302 may be offset from the second section 316 of the cooling channel 302 such that the first section 314 is closer to the tip 212A of the airfoil 212 than the second section 316. Alternatively or in addition, the cooling channel 302 may curve toward the base 212B of the airfoil 212. For example, the cooling channel 302 may curve from the first section 314 of the cooling channel to the second section 316 of the cooling channel 302. In some examples, curving the cooling channel 302 toward the base 212B of the airfoil 212 may be desirable where the pressure of the cooling fluid is sufficiently high to overcome centrifugal forces or if there is no rotation of the airfoil 212.

In some examples, the cooling channel 302 may include the inlet 308 positioned between the standoffs 222. As illustrated in FIG. 20, the cooling channel may include a single inlet adjacent the first dam 306A. In other examples, the cooling channel 302 may include any number of inlets arranged in any uniform or non-uniform pattern, as described herein.

Figure 21:
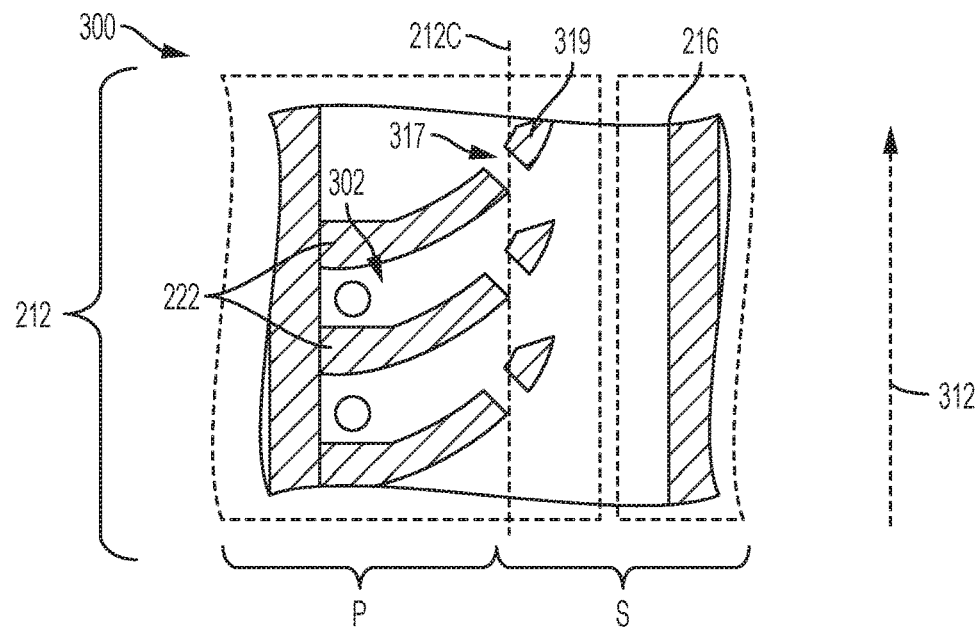
FIG. 21 illustrates a fifth example of an airfoil cooling system.

FIG. 21 illustrates a fifth example of the airfoil cooling system 300. In some examples, the standoffs 222 may include one or more standoff that defines a cross channel 317. For example, the standoff may curve along the spanwise direction 312. The cross channel 317 may be defined between the standoff and a standoff tip 319. The cross channel 317 may be oriented such that a portion of the cooling fluid is diverted from the cooling channel 302 to an adjacent channel. The flow of cooling fluid from the cross channel 317 may mix with the flow of the cooling fluid in the adjacent channel. The cross channel 317 may be defined along or in the vicinity of the leading edge 212C to promote mixing of cooling along the leading edge 212C.

Figure 22:
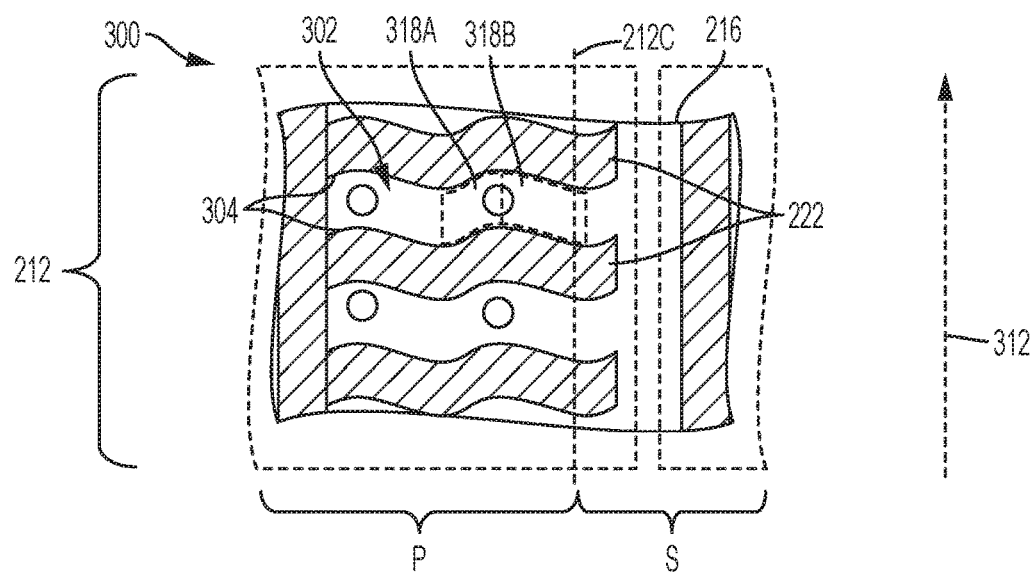
FIG. 22 illustrates a sixth example of an airfoil cooling system.

FIG. 22 illustrates a sixth example of the airfoil cooling system 300. In some examples, the cooling channel 302 may repeatedly curve in alternating directions along the length of the cooling channel 302. For example, the standoffs 222 may be arranged on the spar 216 in a wave pattern. The cooling channel 302 may convey the cooling fluid along an undulating path defined by the standoffs 222. The opposing sides 304 of the standoffs 222 may define the cooling channel 302 which undulates between the opposing sides 304. For example, the opposing sides 304 of the standoffs 222 may repeatedly curve away from the tip 212A of the airfoil 212 and then toward the tip 212A of the airfoil 212.

Alternatively or in addition, the cooling channel 302 may include a plurality of curves 318. The curves 318 of the cooling channel 302 may be defined between curves in the standoffs 222. The curves 318 of the cooling channel 302 may include a first curve 318A and a second curve 318B. The first curve 318A may curve along the spanwise direction 312 toward the tip 212A of the airfoil 212. The second curve 318b may curve toward the base 212B of the airfoil 212. In some examples, the second curve 318B may begin wherein the first curve 318A ends. Alternatively or in addition, the cooling channel 302 may include any number of curved sections that alternate between curving toward the tip 212A of the airfoil 212 and toward the base 212B of the airfoil 212.

Figure 23:
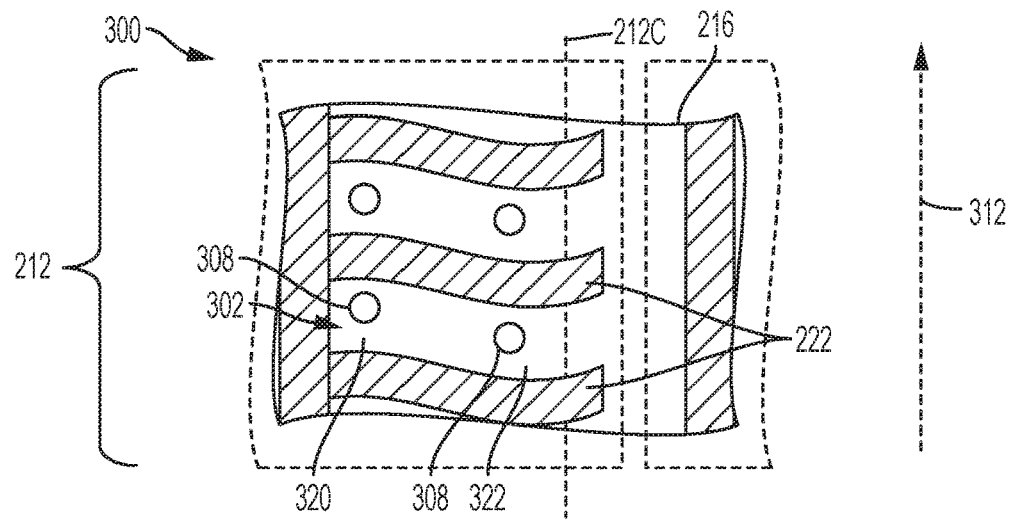
FIG. 23 illustrates a seventh example of an airfoil cooling system.

FIG. 23 illustrates a seventh example of the airfoil cooling system 300. In some examples, the cooling channel 302 may include one or more peak section 320 and one or more trough section 322. The peak section 320 and/or the trough section 322 may include a section of the cooling channel 302 where the cooling channel 302 shifts from curving in a first direction to curving in a second direction. For example, the peak section 320 may include a portion of the cooling channel 302 where the cooling channel 302 shifts from curving toward the tip 212A of the airfoil 212 to curving toward the base 212B of the airfoil 212. The trough section 322 of the cooling channel 302 may include a portion of the cooling channel 302 where the cooling channel 302 shifts from curving toward the base 212B of the airfoil 212 to curving toward the tip 212A of the airfoil 212.

As shown in the example illustrated in FIG. 23, the cooling channel 302 may include one peak and one trough. In other examples, the cooling channel 302 may include multiple trough sections and multiple peak sections. The trough sections may be aligned with each other and the peak sections may be aligned with each other. The trough sections may be offset from the peak sections in the spanwise direction 312.

In some examples, the inlet 308, or a portion thereof, may be defined on the spar 216 in the peak section 320 of the cooling channel 302. Alternatively or in addition, the inlet 308 may be position in the trough section 322 of the cooling channel 302. In other examples, the inlet 308 may be arranged with other inlets in any uniform or non-uniform pattern.

Figure 24:
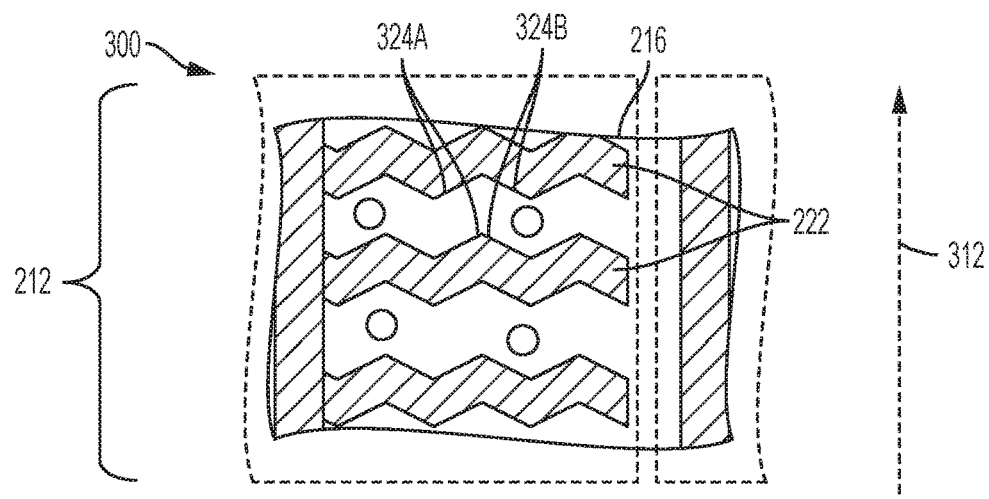
FIG. 24 illustrates an eighth example of an airfoil cooling system.

FIG. 24 illustrates an eighth example of the airfoil cooling system 300. In some examples, the one or more of the standoffs 222 may define a ripple pattern. For example, the standoffs 222 may include multiple opposing side sets 324. The opposing side sets 324 may include a first opposing side set 324A that extends along a first spanwise direction. Alternatively or in addition, the opposing side sets 324 may include a second opposing side set 324B that extends along a second spanwise direction. The first spanwise direction may include the spanwise direction 312 pointing toward the tip 212A of the airfoil 212. The second spanwise direction may be opposite the first spanwise direction. For example, the second spanwise direction may point toward the base 212B of the airfoil 212.

An opposing side set may include any set of opposing sides 304 of the standoffs 222 that partially or completely defines the cooling channel 302. The cooling channel 302 may be defined between the first opposing side set 314A sides and the second opposing side set 324B. The first opposing side set 324A and the second opposing side set 324B may adjacent to each other such that the cooling channel 302 extends along the first direction between the first opposing side set 324A and then extends along the second direction between the second opposing side set 324B.

Figure 25:
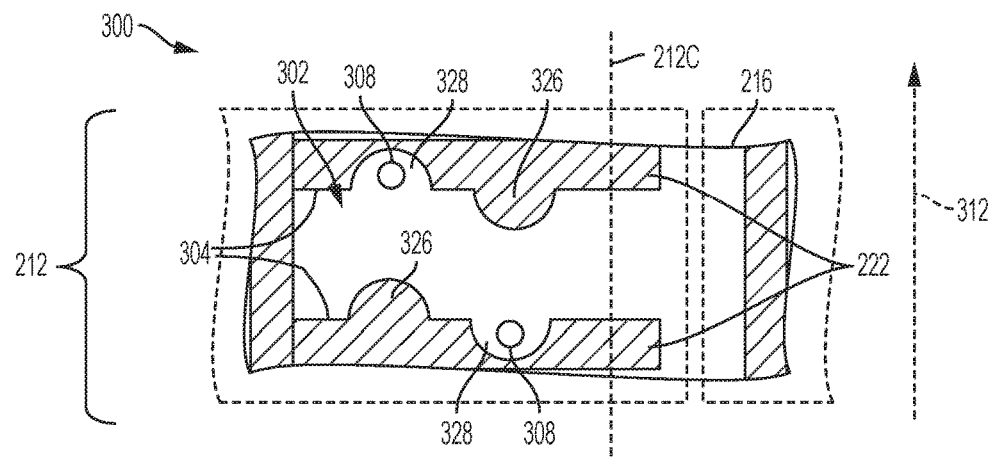
FIG. 25 illustrates a ninth example of an airfoil cooling system.

FIG. 25 illustrates a ninth example of the airfoil cooling system 300. In some examples, the system 300 may include one or more of the standoffs 222 that include a protrusion 326 and/or define a pocket 328. For example, the standoffs 222 may define the cooling channel 302.

The protrusion 326 may include a decoration included in or joined to one or more standoffs 222 that increases a pressure of cooling fluid in the cooling channel 302. The protrusion 326 may extend from the standoff into the cooling channel 302. Alternatively or in addition, the protrusion 326 may partially define the cooling channel 302. In some examples, one or more of the protrusion 326 may extend from one or both, of the opposing sides 304 of the standoffs 222. The protrusion 326 may extend toward the base 212B of the airfoil 212, the tip 212A of the airfoil 212, and/or in any other direction. The protrusion may include any example of the turbulators 36, 236 described herein.

The pocket 328 may include a recess defined by the standoff that extends into the standoff. For example, a portion of the side of the standoff may extend into the standoff to define the pocket 328. The cooling channel 302 may include the pocket 328 defined by the standoff. In some examples, the inlet 308 may be disposed in the pocket 328, or any portion thereof. The standoff may include one or more pockets along the length of the standoff.

In some examples, the pocket 328, or a portion thereof, may be aligned with the protrusion 326. For example, the protrusion 326 may extend from an opposing side of a first standoff. The pocket 328 may be defined on an opposing side of a second standoff. The first and second standoff may at least partially define the cooling channel 302. The pocket 328 may be aligned with the protrusion 326 such that the protrusion 326 extends toward the pocket 328. In some examples, the first opposing side and/or the second opposing side may alternate between protrusions and pockets defined along a length of the cooling channel 302. The cooling fluid may traverse the protrusions and pockets along the length of the cooling channel 302.

Figure 26:
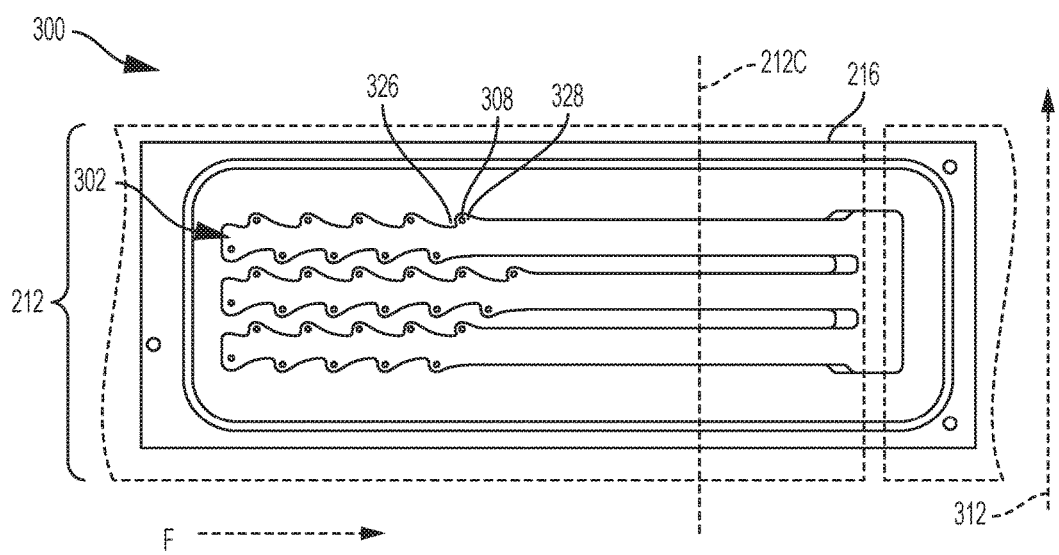
FIG. 26 illustrates a tenth example of an airfoil cooling system.

FIG. 26 illustrates a tenth example of the airfoil cooling system 300. In some examples, the protrusion 326 may at least partially define the pocket 328. For example, the protrusion 326 may extend into the cooling channel 302. The pocket 328 may recess into at least a portion of the protrusion 326. The inlet 308 may be positioned within the pocket 328. Cooling fluid may exit the inlet 308 and flow along a flow direction F within the cooling channel 302. The flow direction F may be oriented toward the leading edge 212C of the airfoil and/or in a chordwise direction relative to the airfoil 212.

In some examples, the protrusion 326 that may block at least a portion of the inlet 308 from the flow of the cooling fluid from one or more inlets upstream of the inlet 308. Alternatively or in addition, the protrusion 326 may deflect the cooling fluid away from the inlet 308 positioned in the pocket 238 at least partially defined by the protrusion 326.

Figure 27:
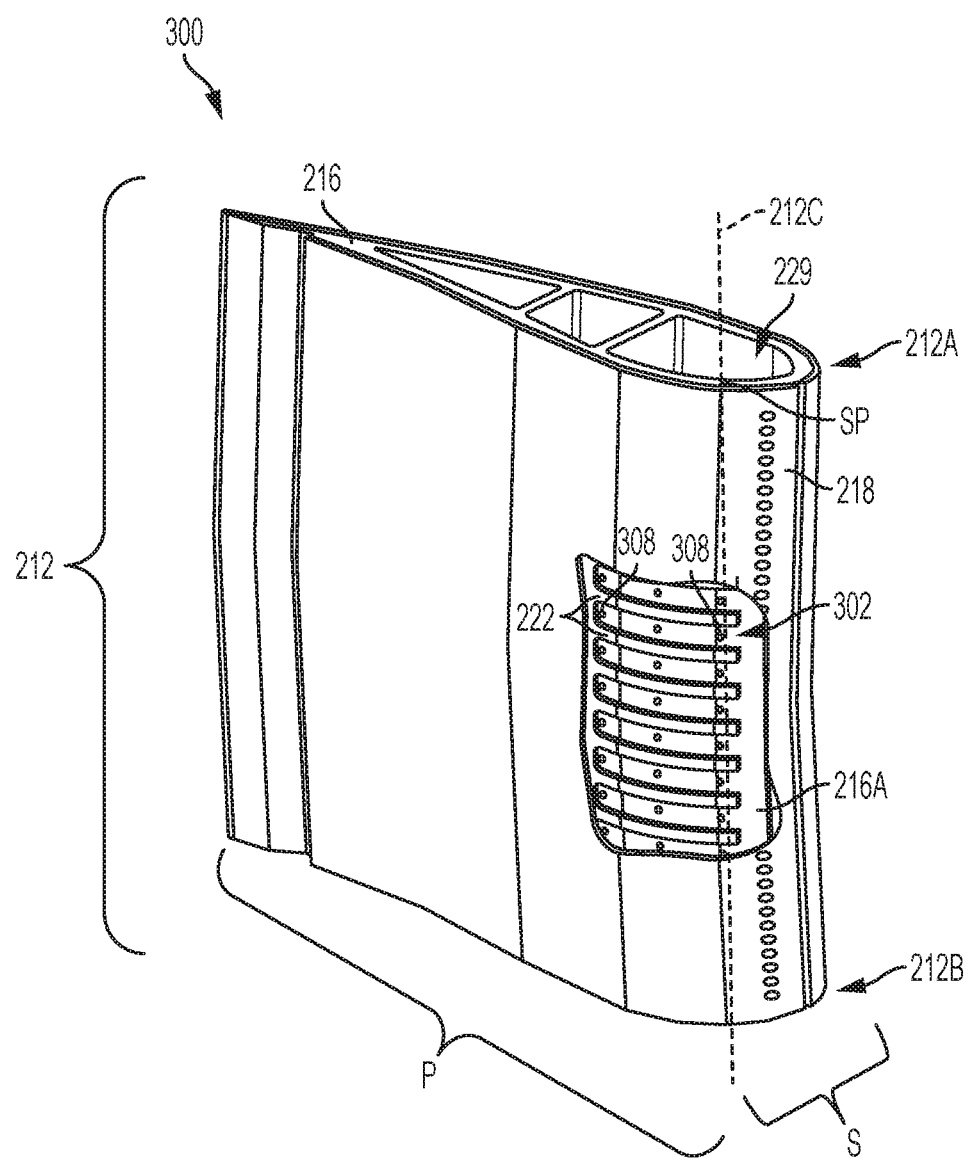
FIG. 27 illustrates an eleventh example of an airfoil cooling system.

FIG. 27 illustrates an eleventh example of the airfoil cooling system 300. The system 300 may include the airfoil 212. The airfoil 212 may include the spar 216. The spar 216 may include the standoffs 222 on the outer surface 216A of the spar 216. Two of the standoffs 222 may define the cooling channel 302. The spar 216 may include one or more of the cooling channel 302 defined between the standoffs 222. The cooling channel 302 may extend across the leading edge 212C of the airfoil 212, from the pressure side P to the suction side S.

The spar 216 may define the inlet 308 that extends from the outer surface 216A of the spar 216 to the cooling air internal plenum 229. The inlet 308 may convey cooling fluid received from the cooling air internal plenum 229 to the outer surface 216A of the spar 216. The cooling channel 302 may convey the cooling fluid from the pressure side P of the airfoil 212 to the suction side S (only a portion shown in FIG. 27) of the airfoil 212. Alternatively or in addition, the cooling channel 302 may convey the cooling fluid across the leading edge 212C of the airfoil 212. The leading edge 212C of the airfoil 212 may extend through the stagnation point SP of the airfoil 212. In some examples, the system 300 may define multiple cooling channels on the outer surface 216A of the spar 216. One or more of the inlet 308 may be positioned in each of the cooling channels. The inlets in each of the cooling channels may be spaced as to maintain cooling performance, depending on the design considerations of the airfoil 212.

In some examples, the cooling channel 302 may curve toward the tip 212A of the airfoil 212 and/or the base 212B of the airfoil 212. The tip 212A of the airfoil 212 may include a first end of the airfoil. The base 212B of the airfoil 212 may include a second end of the airfoil 212. Alternatively or in addition, the cooling channel 302 may curve toward a tip of the spar 216 and/or a base of the spar 216. The tip of the spar 216 may include a first end of the spar 216 and the base of the spar 216 may include a second end of the spar 216. The first end of the spar 216 may be opposite the second end of the spar 216. The leading edge 212C of the airfoil may span between the tip 212A of the airfoil 212 and the base 212B of the airfoil 212. The leading edge may extend through the stagnation point SP of the airfoil.

Figure 28:
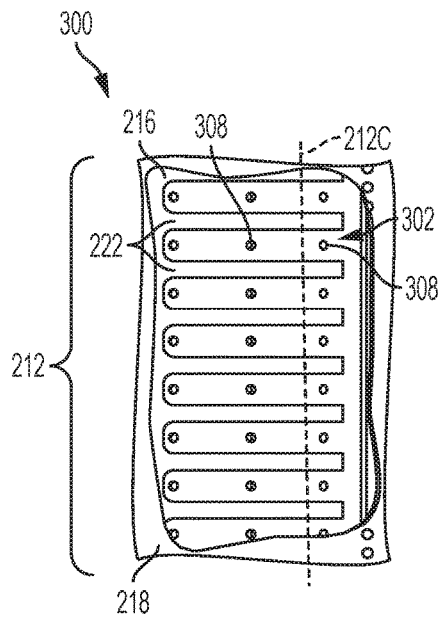
FIG. 28 illustrates a twelfth example of an airfoil cooling system.

FIG. 28 illustrates a twelfth example of the airfoil cooling system 300. In some examples, the spar 216 may include the one or more of the inlet 308. For example, the inlets may be aligned with each other along the cooling channel 302. For example, the cooling channel 302 may include a single row of inlets aligned along the cooling channel 302. The cooling fluid received from the inlets may be conveyed by the standoffs across the leading edge of the airfoil 212. In other examples, the spar may include inlets that are staggered.

Figure 29:
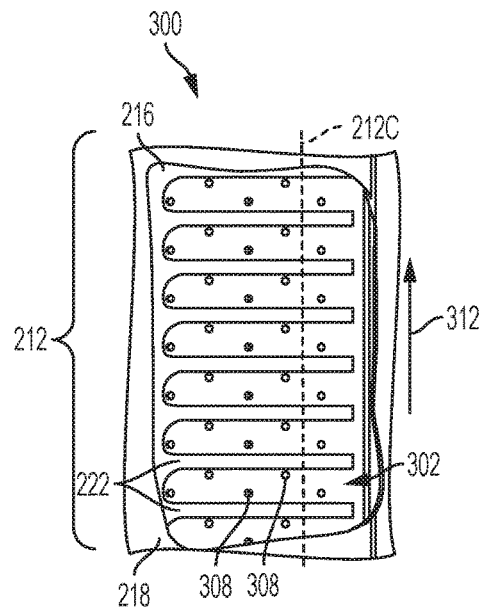
FIG. 29 illustrates a thirteenth example of an airfoil cooling system.

FIG. 29 illustrates a thirteenth example of the airfoil cooling system 300. As illustrated in FIG. 29, the spar 216 includes inlets that are staggered within the cooling channel 302. For example, one or more of the inlet 308 in the cooling channel 302 may be offset from another inlet in the cooling channel 302 relative to the spanwise direction 312. In some examples, a first portion of the inlets positioned in the cooling channel 302 are offset from a second portion of the inlets positioned in the cooling channel 302 in the spanwise direction 312.

In some examples, the cooling channel 302 defined between the standoffs 222 may vary a flow direction of the cooling fluid conveyed by the cooling channel 302.

Figure 30:
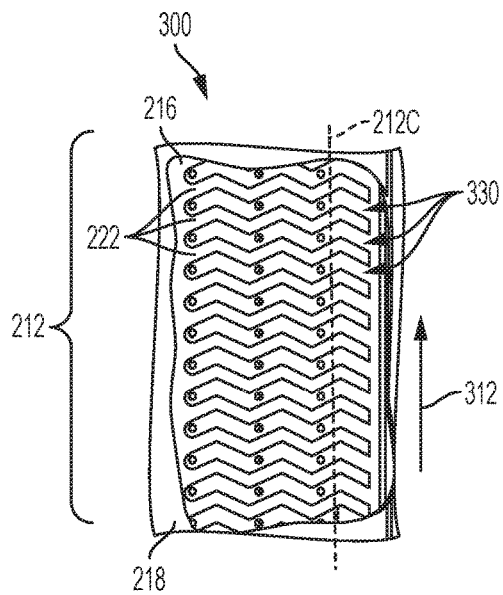
FIG. 30 illustrates a fourteenth example of an airfoil cooling system.

FIG. 30 illustrates a fourteenth example of the airfoil cooling system 300. As shown in FIG. 30, the standoffs 222 may define rippled cooling channels 330. The rippled cooling channels 330 may include examples of the cooling channel 302. The rippled cooling channels 330 may include one or more rippled cooling channel that includes multiple straight portions. A first straight portion of the rippled cooling channel may direct the cooling fluid along the spanwise direction 312 and/or toward the tip 212A of the airfoil 212. A second straight portion of the rippled cooling channel may direct the cooling fluid in a direction opposite the spanwise direction 312 and/or toward the base 212B of the airfoil 212. The first straight portion may be adjacent with the second straight portion such that the rippled cooling channel causes the cooling fluid flowing along the spanwise direction 312 to flow in a direction opposite the spanwise direction 312. The rippled cooling channels 330 may cause abrupt changes in direction of a flow of the cooling fluid to increase flow mixing at the cost of increased pressure drop. In addition, the surface area for the coolant flow may be increased by the rippled cooling channels 330.

Figure 31:
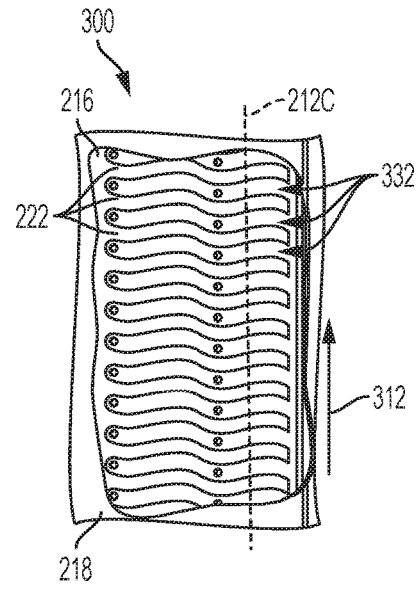
FIG. 31 illustrates a fifteenth example of an airfoil cooling system.

FIG. 31 illustrates a fifteenth example of the airfoil cooling system 300. As shown in FIG. 31, the standoffs 222 may define wavy cooling channels 332. The wavy cooling channels 332 may include an example of the cooling channel 302 that undulates between standoffs 222. In one example, the wavy cooling channels may include one or more wavy cooling channel that has alternating curved sections respectively defined between the standoffs 222. Each of the alternating curved sections may alternate between bending in a first direction and bending in a second direction. For example, the first direction may include the spanwise direction 312 and the second direction may include a direction opposite the spanwise direction 312.

FIG. 32 illustrates a sixteenth example of the airfoil cooling system 300. As shown in FIG. 34, one or more pockets may be aligned with one or more protrusions on the surface of the spar 216. For example, the protrusion 326 of one of the standoffs 222 may extend toward the pocket 238 defined in an adjacent standoff. The protrusion 326 and the pocket 328 may be aligned along the spanwise direction 312 of the airfoil 212.

FIG. 33 illustrates an example of the cooling channel 302 for the airfoil cooling system 300. The inlet 308 may be positioned in the cooling channel 302. At least a portion of the inlet 308 may be defined within the pocket 328. The cooling channel 302 may convey a first flow 334 of cooling fluid within the cooling channel 302. The first flow 334 of cooling fluid may include cooling fluid received from other inlets (not shown in FIG. 36) positioned in the cooling channel 302. The inlet 308 may release a second flow 336 of the cooling fluid into the cooling channel 302. The second flow 336 of cooling fluid may include the cooling fluid exiting the inlet 308. The second flow 336 the cooling fluid may mix with the first flow 334 to cool the first flow 335 of cooling fluid and/or the airfoil 212. For example, the mixing of the first flow 334 and the second flow 336 may cause cooling in a region of the spar 216, the cover sheet 218 (not shown in FIG. 33) and/or the airfoil 212 where the first flow 334 and the second flow 336 interact.

The inlet 308 may be positioned within the pocket 328 to vary the degree of mixing achieved between the first flow 334 and the second flow 336. In some examples, the inlet 308 may be completely recessed within the pocket 328. In other examples, a portion of the inlet 308 may be recessed within the pocket 328 and a remainder of the inlet 308 may be outside of the pocket 328.

In some examples, the protrusion 326 may extend from one of the standoffs 222. For example, the protrusion 326 may be aligned with the pocket 328 and/or the inlet 308. The protrusion 326 may direct the first flow 334 of cooling fluid toward the inlet 308 and/or the pocket 328. Directing the first flow 334 toward the inlet 308 and/or the pocket 328 may enhance mixing of the cooling fluid and improve cooling of the airfoil 212 in a vicinity of the mixing and/or downstream of the mixing.

FIG. 34 illustrates a seventeenth example of the airfoil cooling system 300. As illustrated in FIG. 34, the protrusion 326 may define at least a portion of the pocket 328. Alternatively or in addition, the pocket 328 may extend into at least a portion of the protrusion 326. The pocket 328 may be positioned downstream of the protrusion 326 relative to a channel flow direction 338. The channel flow direction 338 may include a direction that a substantial portion of the cooling fluid travels in the cooling channel. For example, the channel flow direction 338 may include a direction that extends along the cooling channel from the inlet 308 toward the outlet 310.

FIG. 35 illustrates an example of the cooling channel 302 (only a portion shown in FIG. 33) for the airfoil cooling system 300. The standoffs 222 may include one or more standoff that defines the pocket 328. As illustrated in FIG. 35, a concave portion 340 of the standoff may define at least a portion of the pocket 328. The concave portion 340 of the standoff may include a portion of the standoff that extends into the standoff and/or away from a center of the cooling channel 302. The pocket 328 may additionally be defined by a convex portion 342 of the standoff 222. The convex portion 342 of the standoff may include a portion of the standoff that extends away from the standoff and/or toward the center of the cooling channel 302. The concave portion 340 of the standoff may be adjacent to the convex portion 342 of the standoff to define the pocket 328. Alternatively or in addition, the concave portion 340 of the standoff may completely define the pocket 328.

The inlet 208 may be partially or completely disposed within the pocket 238 along the concave portion 340 of the standoff. The standoff may block and/or limit the first flow 334 of cooling fluid from interacting with the second flow 336 of cooling fluid from the inlet 308. The first flow 334 of cooling fluid may include cooling fluid received from one or more adjacent inlets (not shown in FIG. 35) upstream of the inlet 308, relative to the channel flow direction 338. The second flow 336 of cooling fluid may include the cooling fluid received from the inlet 308. The convex portion 342 of the standoff may direct the second flow 336 of cooling fluid toward the center of the cooling channel 302 and/or the first flow 334 of cooling fluid to enhance mixing the flows downstream of the inlet 308, relative to the channel flow direction 338. For example, the convex portion 345 of the standoff may taper toward the center of the cooling channel 302 to guide the second flow 336 of cooling fluid toward the center of the cooling channel 302.

Figure 36:
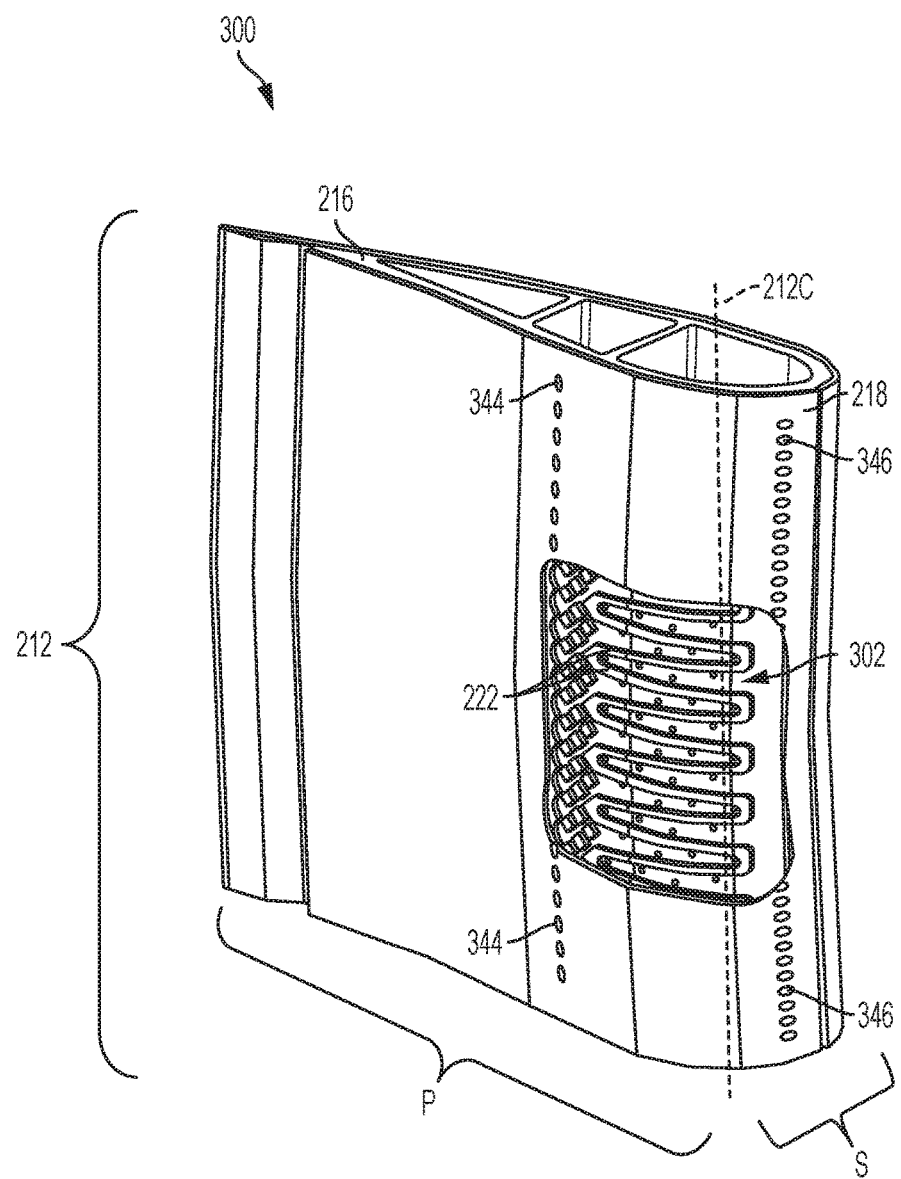
FIG. 36 illustrates an eighteenth example of an airfoil cooling system.

FIG. 36 illustrates an eighteenth example of the airfoil cooling system 300. The system may include the airfoil 212. The airfoil 212 may include the spar 216. The spar 216 may include the standoffs 222 on the outer surface 216A of the spar 216. The standoffs 222 may receive the cover sheet 218. Two of the standoff 222 may define the cooling channel 302. The cooling channel 302 may extend across the leading edge 212C of the spar.

As shown in FIG. 36, the cover sheet 218 may define a pressure side outlet 344 and a suction side outlet 346. The pressure side outlet 344 may include an example of the outlet 310 positioned on the pressure side P of the airfoil 212. The suction side outlet 346 may include an example of the outlet 310 positioned on the suction side S of the airfoil 212. The cover sheet 218 may include one or more of the pressure side outlet 344. Alternatively or in addition, the cover sheet may include one or more of the suction side outlet 346.

One or more of the cooling channel 302 may convey cooling fluid toward the pressure side outlet 344 and/or the suction side outlet 346. As shown in FIG. 36, the spar may include multiple cooling channels, each of the cooling channels may alternate between conveying the cooling fluid toward the pressure side outlet 344 and conveying the cooling fluid toward the suction side outlet 346.

Figure 37:
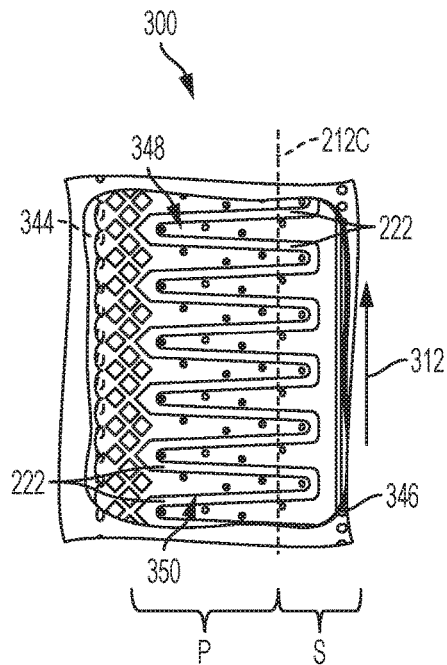
FIG. 37 illustrates a nineteenth example of an airfoil cooling system.

FIG. 37 illustrates a nineteenth example of the airfoil cooling system 300. The standoffs 222 may define a pressure side cooling channel 348 and/or a suction side cooling channel 350. The pressure side cooling channel 348 may include an example of the cooling channel 302 that conveys the cooling fluid toward the pressure side outlet 344 (not shown in FIG. 37). The pressure side cooling channel 348 may receive cooling fluid on the suction side S of the airfoil 212. The pressure side cooling channel 348 may convey the cooling fluid across the leading edge 212C toward the pressure side outlet 344. The suction side cooling channel 350 may include an example of the cooling channel 302 that conveys the cooling fluid toward a suction side outlet 346. The suction side cooling channel 350 may receive the cooling fluid from the pressure side P of the airfoil 212, convey the cooling fluid across the leading edge 212C, and convey the cooling fluid toward the suction side outlet 346. The pressure side cooling channel 348 and/or the suction side cooling channel 350 may extend across the leading edge 212C of the airfoil 212.

In some examples, a first pair of the standoffs 222 may define the pressure side cooling channel 348. Alternatively or in addition, a second pair of the standoffs 222 may define the suction side cooling channel 350. The first pair of the standoffs 222 may include two of the standoffs 222 and the second pair of standoffs may include two of the standoffs 222. The first pair of the standoffs 222 may be offset from the second pair of standoffs in the span wise direction 312. The pressure side cooling channel 348 may be defined between the first pair of the standoffs 222. The suction side cooling channel 350 may be defined between the second pair of standoffs.

Figure 38:
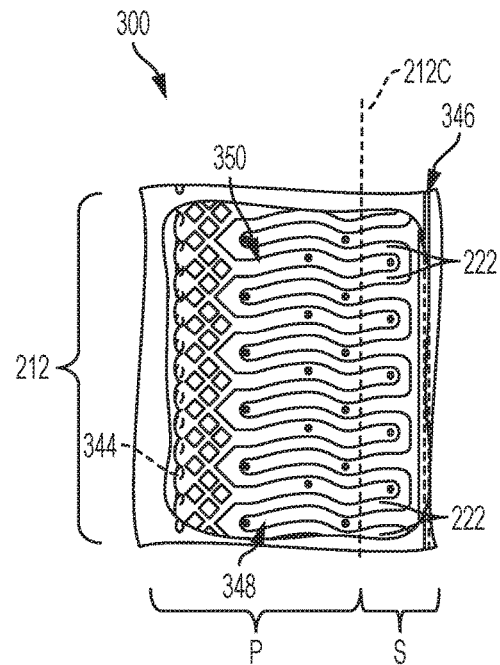
FIG. 38 illustrates a twentieth example of an airfoil cooling system.

FIG. 38 illustrates a twentieth example of the airfoil cooling system 300. As shown in FIG. 38, the pressure side cooling channel 348 may undulate between two of the standoffs 222. Alternatively or in addition, the suction side cooling channel 350 may undulate between two of the standoffs 222. Refer to FIGS. 22-23, and 31, and the related discussion for additional or alternative examples of the cooling channel 302 undulating between the standoffs 222.

Figure 39:
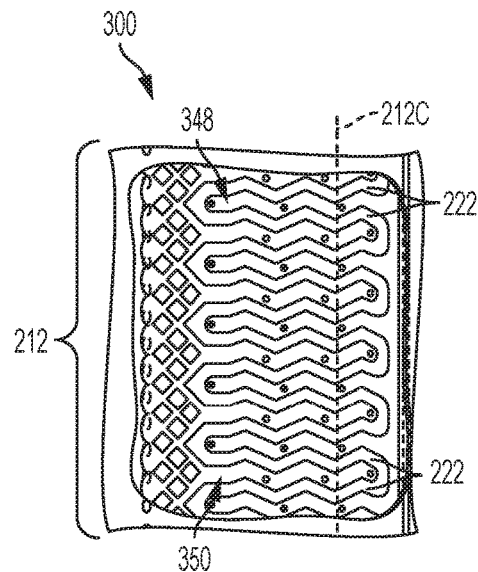
FIG. 39 illustrates a twenty-first example of an airfoil cooling system.

FIG. 39 illustrates a twenty-first example of the airfoil cooling system 300. As shown in FIG. 39, the pressure side cooling channel 348 may ripple between two of the standoffs 222. Alternatively or in addition, the suction side cooling channel 350 may ripple between two of the standoffs 222. Refer to FIGS. 24 and 30, and the related discussion for additional or alternative examples of the cooling channel 302 rippling between the standoffs 222.

Figure 40:
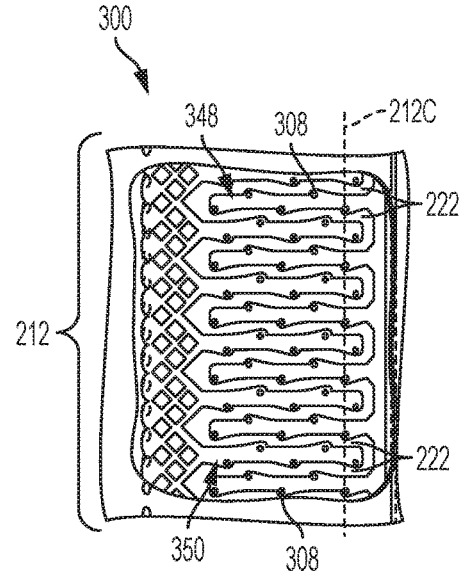
FIG. 40 illustrates a twenty-second example of an airfoil cooling system.

FIG. 40 illustrates a twenty-second example of the airfoil cooling system 300. As illustrated in FIG. 40, one or more pocket 328 may define the pressure side cooling channel 348 and/or the suction side cooling channel 350. Alternatively or in addition, one or more protrusion 326 may define the pressure side cooling channel 348 and/or the suction side cooling channel 350. In other examples, one or more of the outlet 310 may be positioned in the pressure side cooling channel 348 and/or the suction side cooling channel 350.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

The subject-matter of the disclosure may also relate, among others, to the following aspects:

1. A blade or a stator for use in a gas turbine engine, the blade or the stator comprising:
   an airfoil having a first side and a second side that are separated by a leading edge, the leading edge passing through a stagnation point of the airfoil, the airfoil comprising:
   a cover sheet; and
   a spar having an outer surface, the spar comprising a plurality of standoffs configured to receive the cover sheet, wherein two of the standoffs define a cooling channel that extends across the leading edge on the outer surface of the spar, from the first side to the second side, the cooling channel having a first portion defined by the two of the standoffs and a second portion defined by the two of the standoffs, the first portion offset from the second portion in a spanwise direction, the spar further comprising an inlet on the first side, the inlet configured to convey a cooling fluid from a passageway located inside of the spar to the cooling channel, wherein the cooling channel is configured to convey the cooling fluid from the inlet, across the leading edge, and toward an outlet on the second side, wherein the outlet is at least partially defined by the cover sheet.

2. The airfoil of aspect 1, wherein the first side comprises a pressure side of the airfoil and the second side comprises a suction side of the airfoil.

3. The airfoil of any of aspects 1 to 2, wherein the first portion of the cooling channel is on the first side of the spar and the second portion of the cooling channel is on the second side of the spar.

4. The airfoil of any of aspects 1 to 3, wherein the cooling channel curves along the two of the standoffs and is positioned to convey the cooling fluid in the spanwise direction.

5. The airfoil of any of aspects 1 to 4, wherein the two of the standoffs define a first curve of the cooling channel and a second curve of the cooling channel, wherein the first curve of the cooling channel is configured to convey the cooling fluid toward a first end of the airfoil and the second curve of the cooling channel is configured to convey the cooling fluid toward a second end of the airfoil, the first end of the airfoil is opposite of the second end of the airfoil.

6. The airfoil of any of aspects 1 to 5, wherein the cooling channel is defined by a first set of opposing sides of the standoffs and a second set of opposing sides of the standoffs, wherein the first set of opposing sides extend along a first spanwise direction and the second set of opposing sides extend along a second spanwise direction opposite the first spanwise direction.

7. The airfoil of any of aspects 1 to 6, wherein the at least one of the standoffs include a protrusion that extends into the cooling channel.

8. An airfoil cooling system, the airfoil cooling system comprising:
a spar configured to form part of an airfoil, the airfoil having a pressure side and a suction side that are separated by a leading edge, the leading edge passing through a stagnation point of the airfoil, the spar having an outer surface comprising a plurality of standoffs, wherein two of the standoffs define a cooling channel that extends along the outer surface of the spar and across the leading edge, from the pressure side to the suction side, wherein at least one of the standoffs includes a protrusion that extends into the cooling channel, the spar further comprising an inlet on the pressure side or the suction side, the inlet configured to convey a cooling fluid from a plenum located inside of the spar to the cooling channel.

9. The airfoil cooling system of aspect 8, wherein the at least one of the standoffs defines a pocket that is recessed into the at least one of the standoffs.

10. The airfoil cooling system of any of aspects 8 to 9, wherein a portion of the inlet is defined on the outer surface of the spar within a portion of the pocket.

11. The airfoil cooling system of aspects 8 to 10, wherein the pocket is at least partially defined by the protrusion.

12. The airfoil cooling system of aspects 8 to 11, wherein the cooling channel curves along a spanwise direction.

13. The airfoil cooling system of aspects 8 to 12, wherein the cooling channel undulates between opposing sides of the standoffs.

14. The airfoil cooling system of aspects 8 to 13, wherein the cooling channel comprises a first cooling channel and the two of the standoffs comprise a first pair of the standoffs, the airfoil cooling system further comprising a cover sheet that defines a first outlet on the pressure side of the airfoil and a second outlet on the suction side of the airfoil, wherein a second cooling channel is defined between a second pair of the standoffs, the second cooling channel offset from the first cooling channel in a spanwise direction, wherein the first cooling channel is configured to convey cooling fluid toward the first outlet and the second cooling channel is configured to convey the cooling fluid toward the second outlet.

15. An airfoil cooling system, the airfoil cooling system comprising:
a spar configured to form part of an airfoil, the airfoil having a pressure side and a suction side that are separated by a leading edge, the leading edge passing through a stagnation point of the airfoil, the spar having an outer surface comprising a plurality of standoffs, wherein two of the standoffs define a cooling channel that extends across the leading edge on the outer surface of the spar, from the pressure side to the suction side, the cooling channel having a first portion defined by the standoffs and a second portion defined by the standoffs, the first portion located closer to a base or a tip of the airfoil than the second portion, the spar further comprising an inlet on the pressure side or the suction side, the inlet configured to convey a cooling fluid from a passageway located inside of the spar to the cooling channel.

16. The airfoil cooling system of aspect 15, further comprising a cover sheet, wherein the cover sheet defines at least a portion an outlet that receives cooling fluid from the cooling channel, wherein the outlet is configured to provide film cooling to an outer surface of the cover sheet.

17. The airfoil cooling system of any of aspects 15 to 16, wherein the inlet is included on the pressure side of the airfoil and the outlet is included on the suction side of the airfoil.

18. The airfoil cooling system of any of aspects 15 to 17, wherein the cooling channel is further defined by a dam, wherein the inlet is positioned adjacent to the dam.

19. The airfoil cooling system of any of aspects 15 to 18, wherein the cooling channel is further defined by a pocket that is recessed into at least one of the standoffs.

20. The airfoil cooling system of any of aspects 15 to 19, wherein at least one of the standoffs includes a protrusion that extends into the cooling channel.

What is claimed is:

1. A blade or a stator for use in a gas turbine engine, the blade or the stator comprising:
an airfoil having a first side and a second side that are separated by a leading edge, the leading edge passing through a stagnation point of the airfoil, the airfoil comprising:
a cover sheet; and
a spar having an outer surface, the spar comprising a plurality of standoffs configured to receive the cover sheet, wherein two of the standoffs define a cooling channel that extends across the leading edge on the outer surface of the spar, from the first side to the second side, the cooling channel having a first portion defined by the two of the standoffs and a second portion defined by the two of the standoffs, the first portion offset from the second portion in a spanwise direction, the spar further comprising an inlet on the first side, the inlet configured to convey a cooling fluid from a passageway located inside of the spar to the cooling channel, wherein the cooling channel is configured to convey the cooling fluid from the inlet, across the leading edge, and toward an outlet on the second side, wherein the outlet is at least partially defined by the cover sheet.

2. The airfoil of claim 1, wherein the first side comprises a pressure side of the airfoil and the second side comprises a suction side of the airfoil.

3. The airfoil of claim 1, wherein the first portion of the cooling channel is on the first side of the spar and the second portion of the cooling channel is on the second side of the spar.

4. The airfoil of claim 1, wherein the cooling channel curves along the two of the standoffs and is positioned to convey the cooling fluid in the spanwise direction.

5. The airfoil of claim 1, wherein the two of the standoffs define a first curve of the cooling channel and a second curve of the cooling channel, wherein the first curve of the cooling channel is configured to convey the cooling fluid toward a first end of the airfoil and the second curve of the cooling channel is configured to convey the cooling fluid toward a second end of the airfoil, the first end of the airfoil is opposite of the second end of the airfoil.

6. The airfoil of claim 1, wherein the cooling channel is defined by a first set of opposing sides of the standoffs and a second set of opposing sides of the standoffs, wherein the first set of opposing sides extend along a first spanwise direction and the second set of opposing sides extend along a second spanwise direction opposite the first spanwise direction.

7. The airfoil of claim 1, wherein the at least one of the standoffs include a protrusion that extends into the cooling channel.

8. An airfoil cooling system, the airfoil cooling system comprising:
a spar configured to form part of an airfoil, the airfoil having a pressure side and a suction side that are separated by a leading edge, the leading edge passing through a stagnation point of the airfoil, the spar having an outer surface comprising a plurality of standoffs, wherein two of the standoffs define a cooling channel that extends along the outer surface of the spar and across the leading edge, from the pressure side to the suction side, wherein at least one of the standoffs includes a protrusion that extends into the cooling channel, the spar further comprising an inlet on the pressure side or the suction side, the inlet configured to convey a cooling fluid from a plenum located inside of the spar to the cooling channel.

9. The airfoil cooling system of claim 8, wherein the at least one of the standoffs defines a pocket that is recessed into the at least one of the standoffs.

10. The airfoil cooling system of claim 9, wherein a portion of the inlet is defined on the outer surface of the spar within a portion of the pocket.

11. The airfoil cooling system of claim 9, wherein the pocket is at least partially defined by the protrusion.

12. The airfoil cooling system of claim 8, wherein the cooling channel curves along a spanwise direction.

13. The airfoil cooling system of claim 8, wherein the cooling channel undulates between opposing sides of the standoffs.

14. The airfoil cooling system of claim 8, wherein the cooling channel comprises a first cooling channel and the two of the standoffs comprise a first pair of the standoffs, the airfoil cooling system further comprising a cover sheet that defines a first outlet on the pressure side of the airfoil and a second outlet on the suction side of the airfoil, wherein a second cooling channel is defined between a second pair of the standoffs, the second cooling channel offset from the first cooling channel in a spanwise direction, wherein the first cooling channel is configured to convey cooling fluid toward the first outlet and the second cooling channel is configured to convey the cooling fluid toward the second outlet.

15. An airfoil cooling system, the airfoil cooling system comprising:
a spar configured to form part of an airfoil, the airfoil having a pressure side and a suction side that are separated by a leading edge, the leading edge passing through a stagnation point of the airfoil, the spar having an outer surface comprising a plurality of standoffs, wherein two of the standoffs define a cooling channel that extends across the leading edge on the outer surface of the spar, from the pressure side to the suction side, the cooling channel having a first portion defined by the standoffs and a second portion defined by the standoffs, the first portion located closer to a base or a tip of the airfoil than the second portion, the spar further comprising an inlet on the pressure side or the suction side, the inlet configured to convey a cooling fluid from a passageway located inside of the spar to the cooling channel.

16. The airfoil cooling system of claim 15, further comprising a cover sheet, wherein the cover sheet defines at least a portion an outlet that receives cooling fluid from the cooling channel, wherein the outlet is configured to provide film cooling to an outer surface of the cover sheet.

17. The airfoil cooling system of claim 16, wherein the inlet is included on the pressure side of the airfoil and the outlet is included on the suction side of the airfoil.

18. The airfoil cooling system of claim 15, wherein the cooling channel is further defined by a dam, wherein the inlet is positioned adjacent to the dam.

19. The airfoil cooling system of claim 15, wherein the cooling channel is further defined by a pocket that is recessed into at least one of the standoffs.

20. The airfoil cooling system of claim 15, wherein at least one of the standoffs includes a protrusion that extends into the cooling channel.

* * * * *